Figure 1:
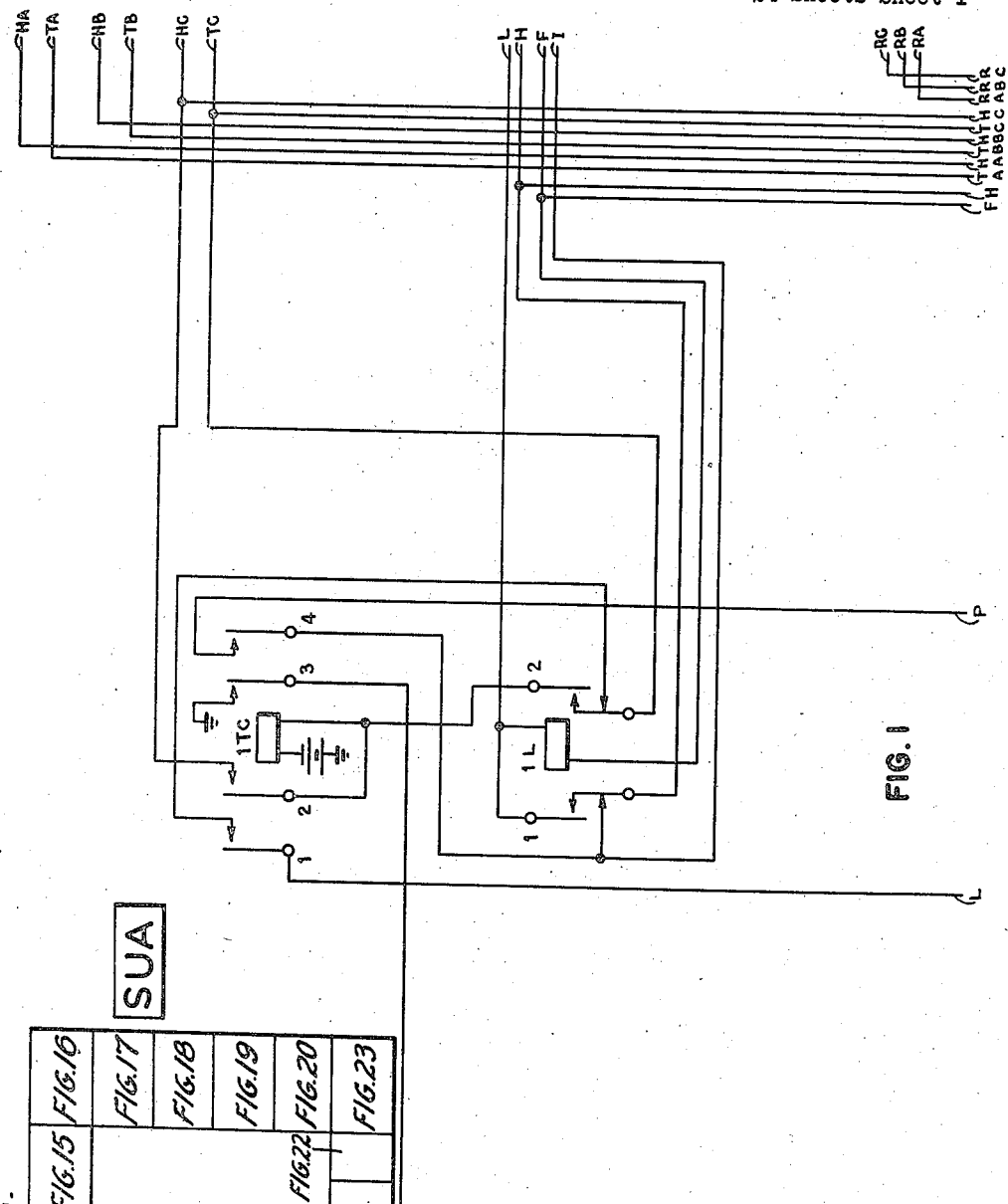

Nov. 2, 1948.  E. M. S. McWHIRTER ET AL  2,452,590
ELECTRIC SIGNALING SYSTEM
Filed Jan. 8, 1945  24 Sheets-Sheet 3

INVENTORS
ERIC MALCOLM SWIFT McWHIRTER
HUGH JENNINGS WARD
BY
ATTORNEY

Nov. 2, 1948.  E. M. S. McWHIRTER ET AL  2,452,590
ELECTRIC SIGNALING SYSTEM
Filed Jan. 8, 1945  24 Sheets-Sheet 7

INVENTORS
ERIC MALCOLM SWIFT McWHIRTER
HUGH JENNINGS WARD
BY
*Edward D. Phinney*
ATTORNEY

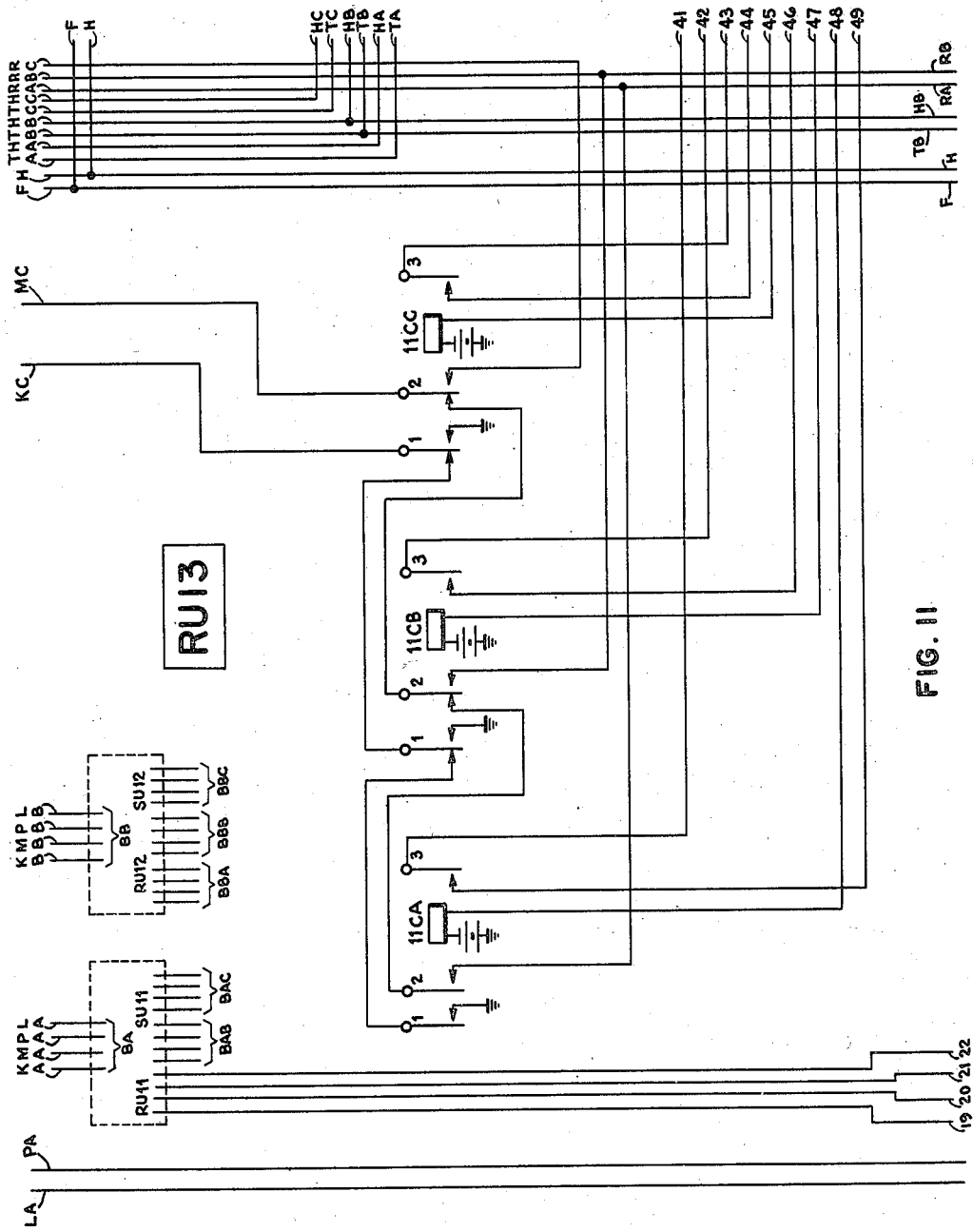

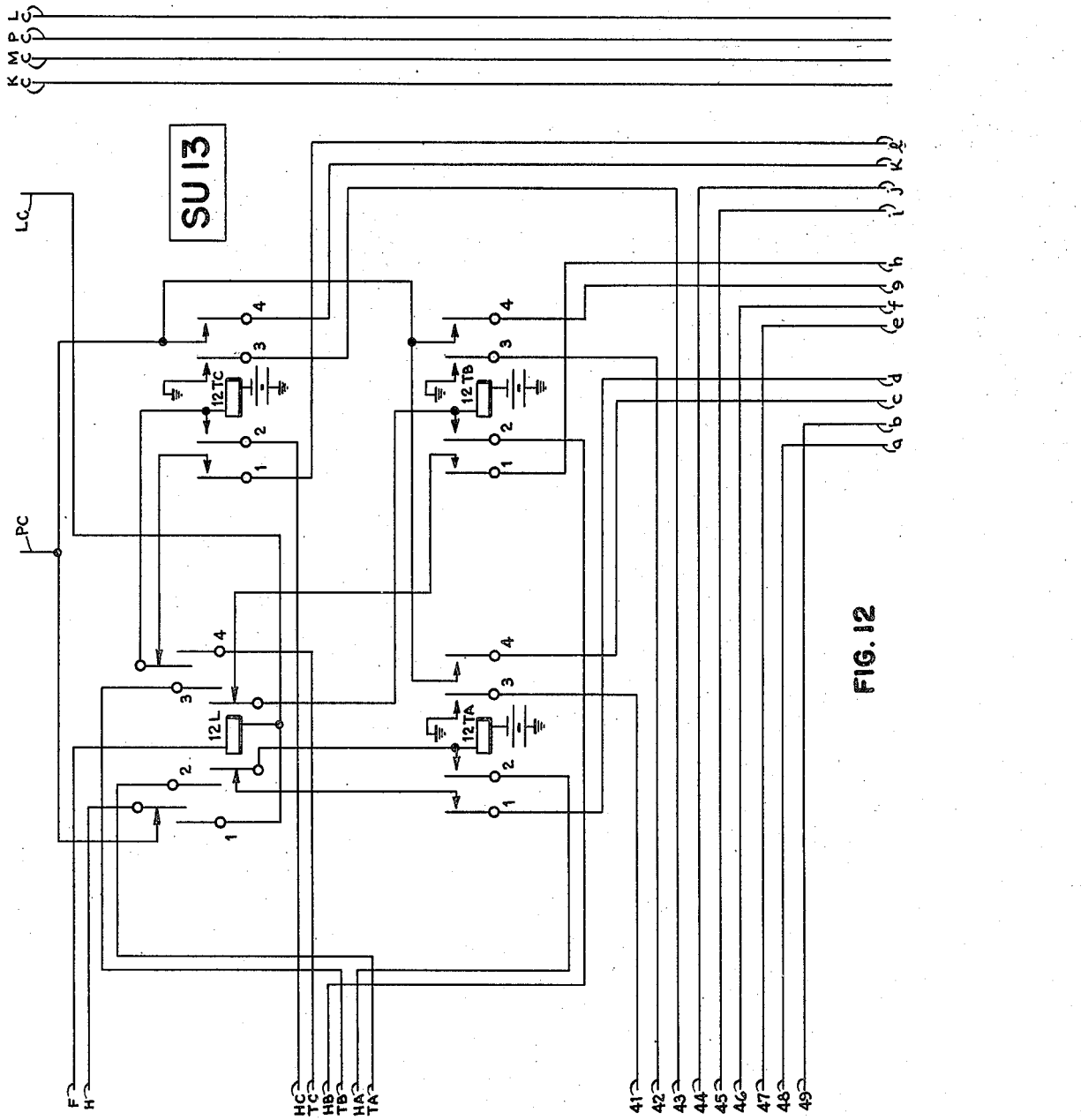

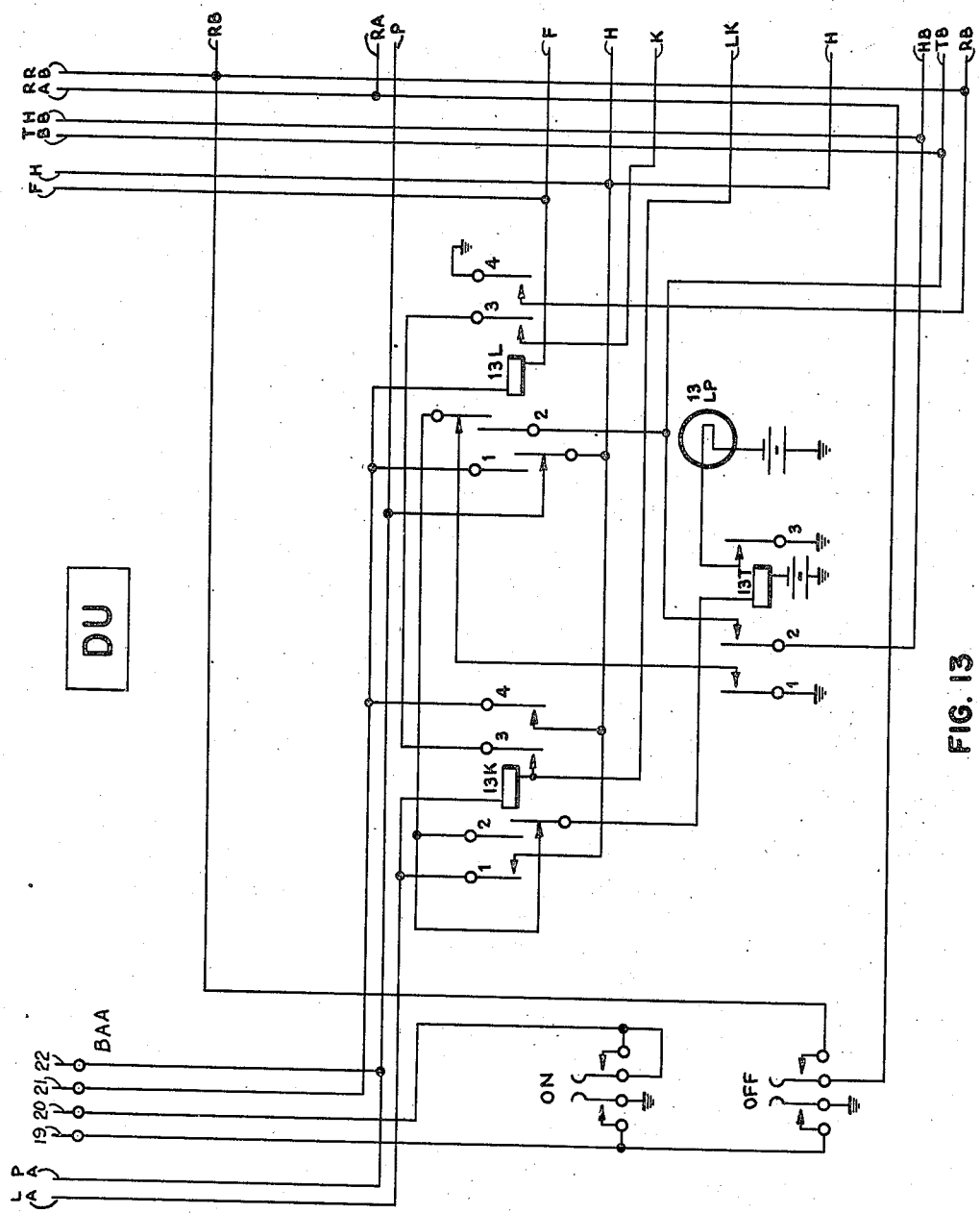

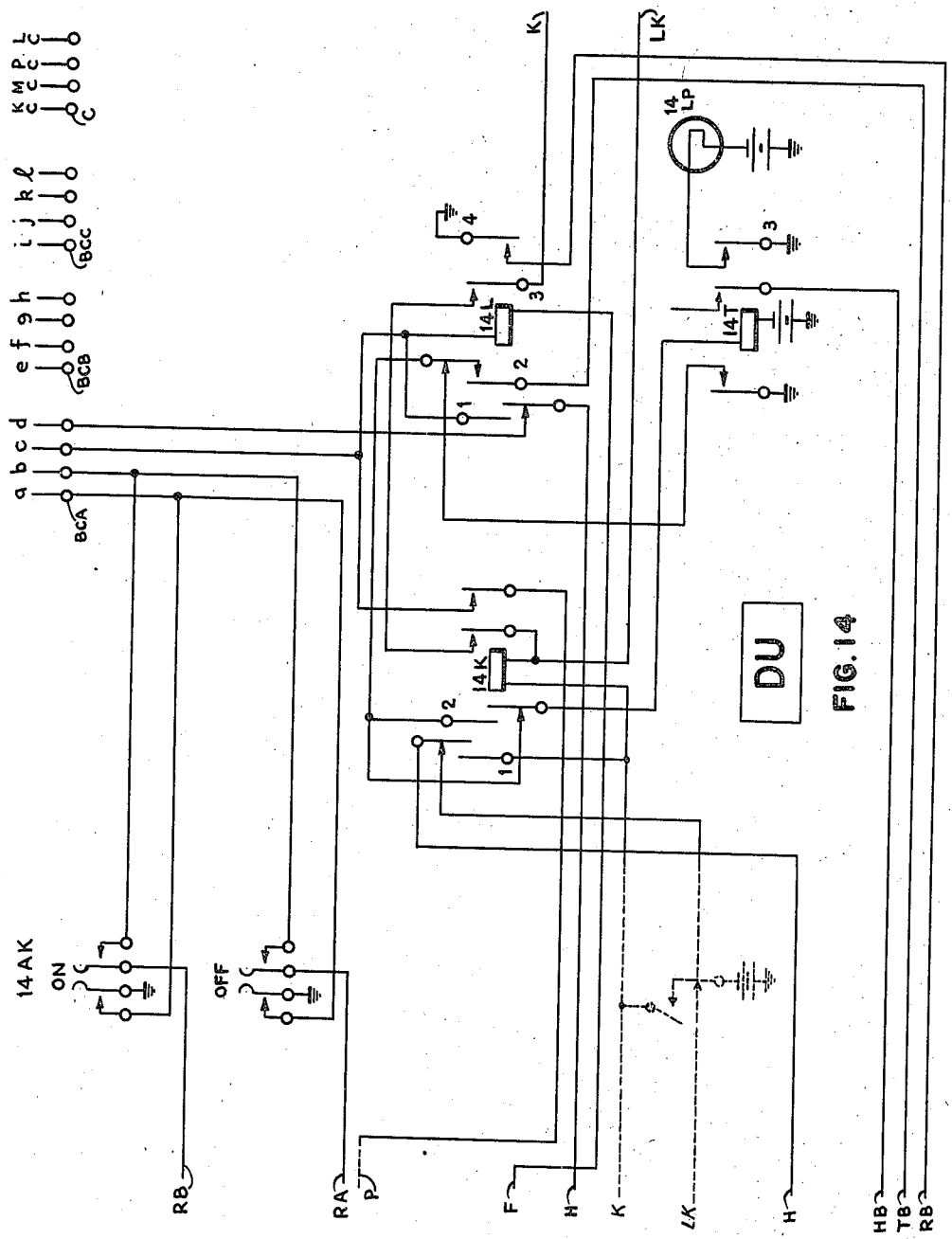

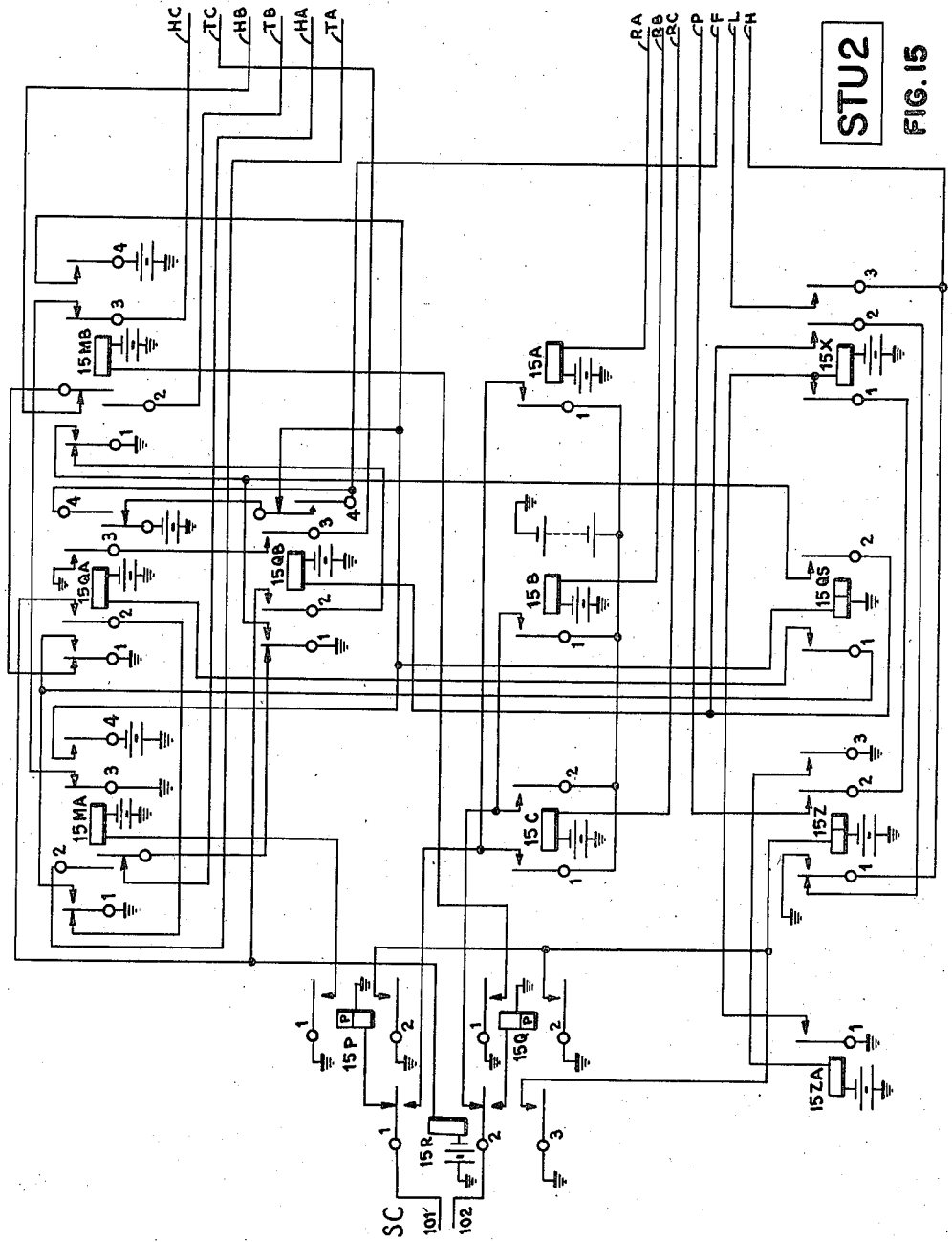

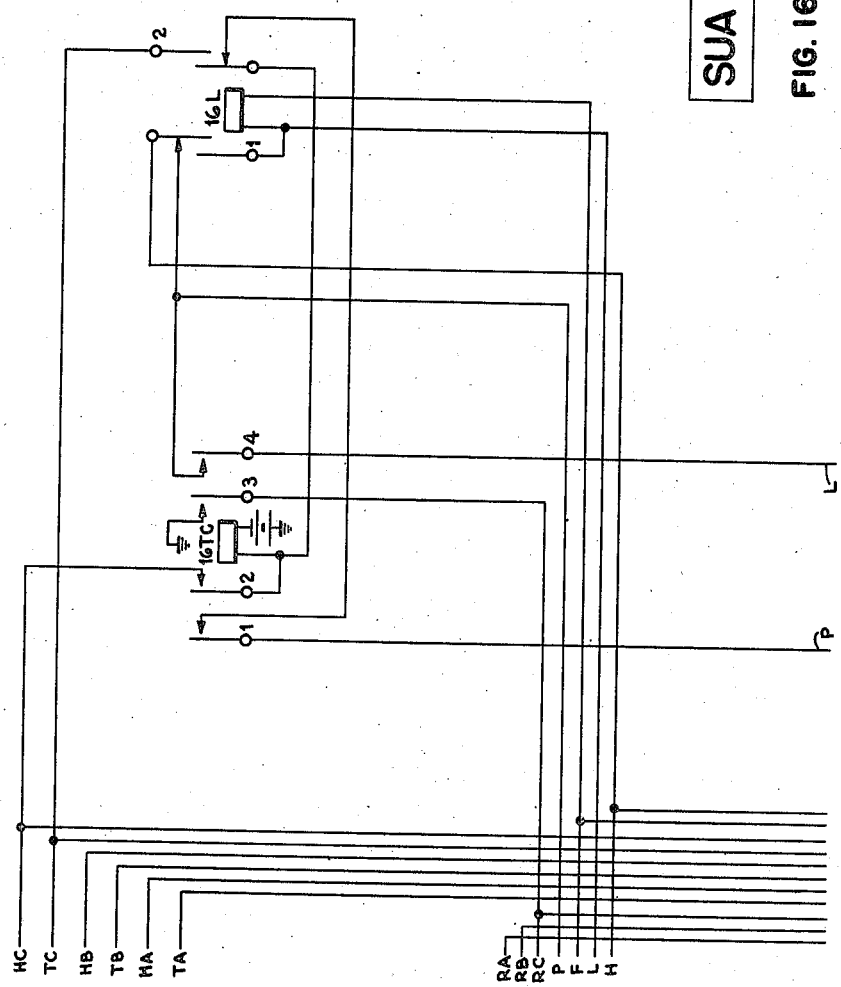

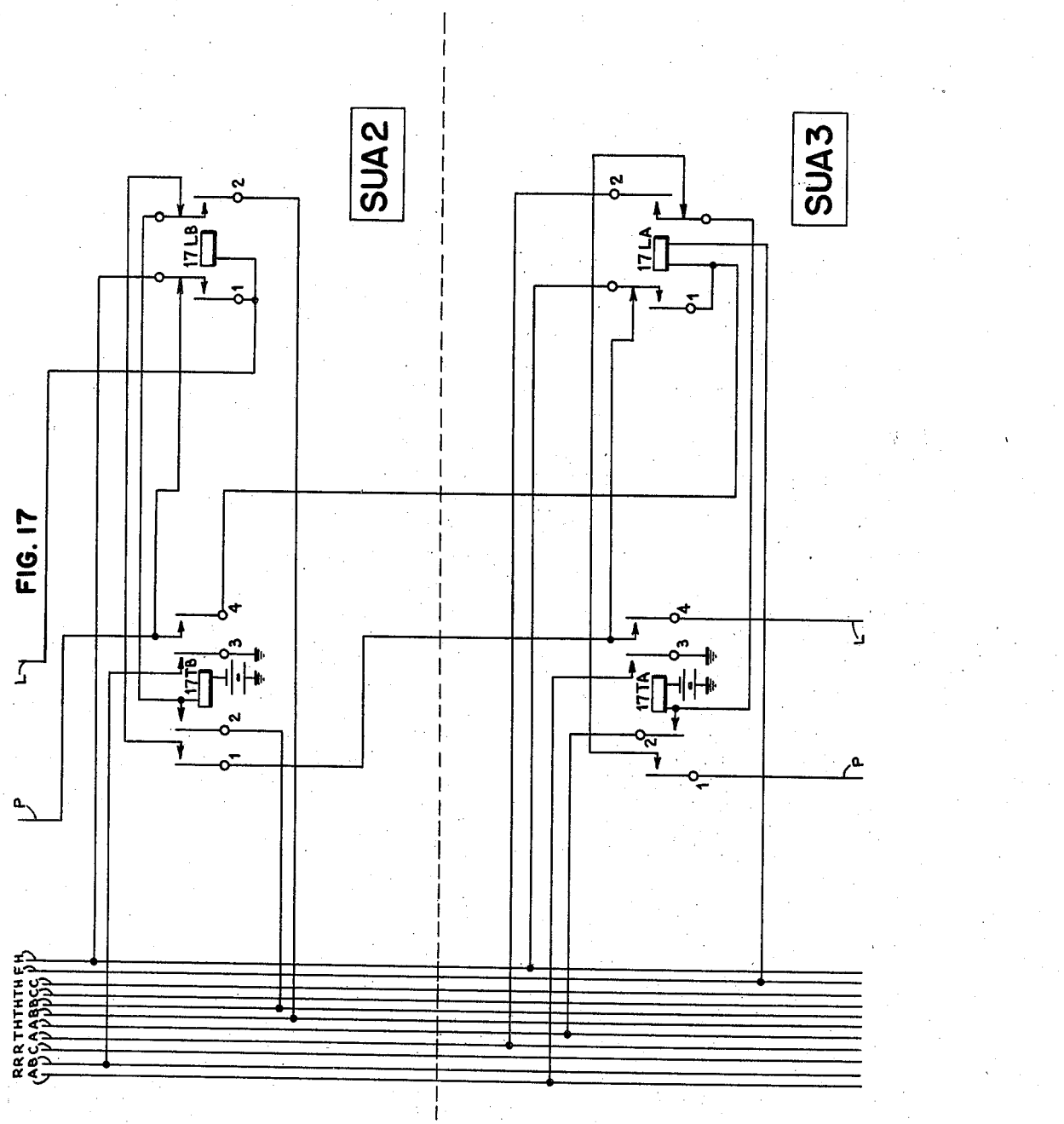

Nov. 2, 1948. E. M. S. McWHIRTER ET AL 2,452,590
ELECTRIC SIGNALING SYSTEM
Filed Jan. 8, 1945 24 Sheets-Sheet 18
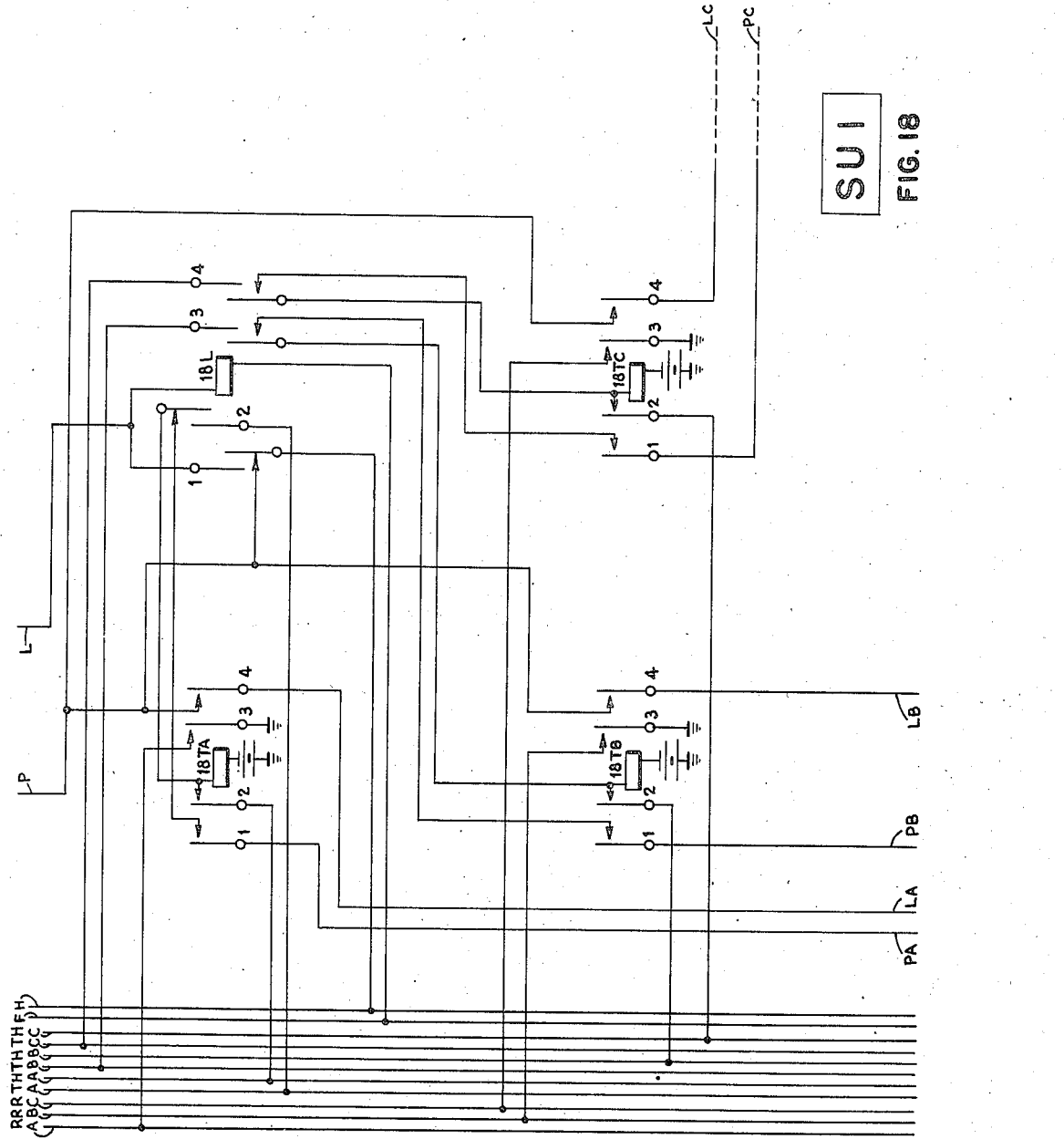
INVENTORS
ERIC MALCOLM SWIFT McWIRTER
HUGH JENNINGS WARD
BY
ATTORNEY

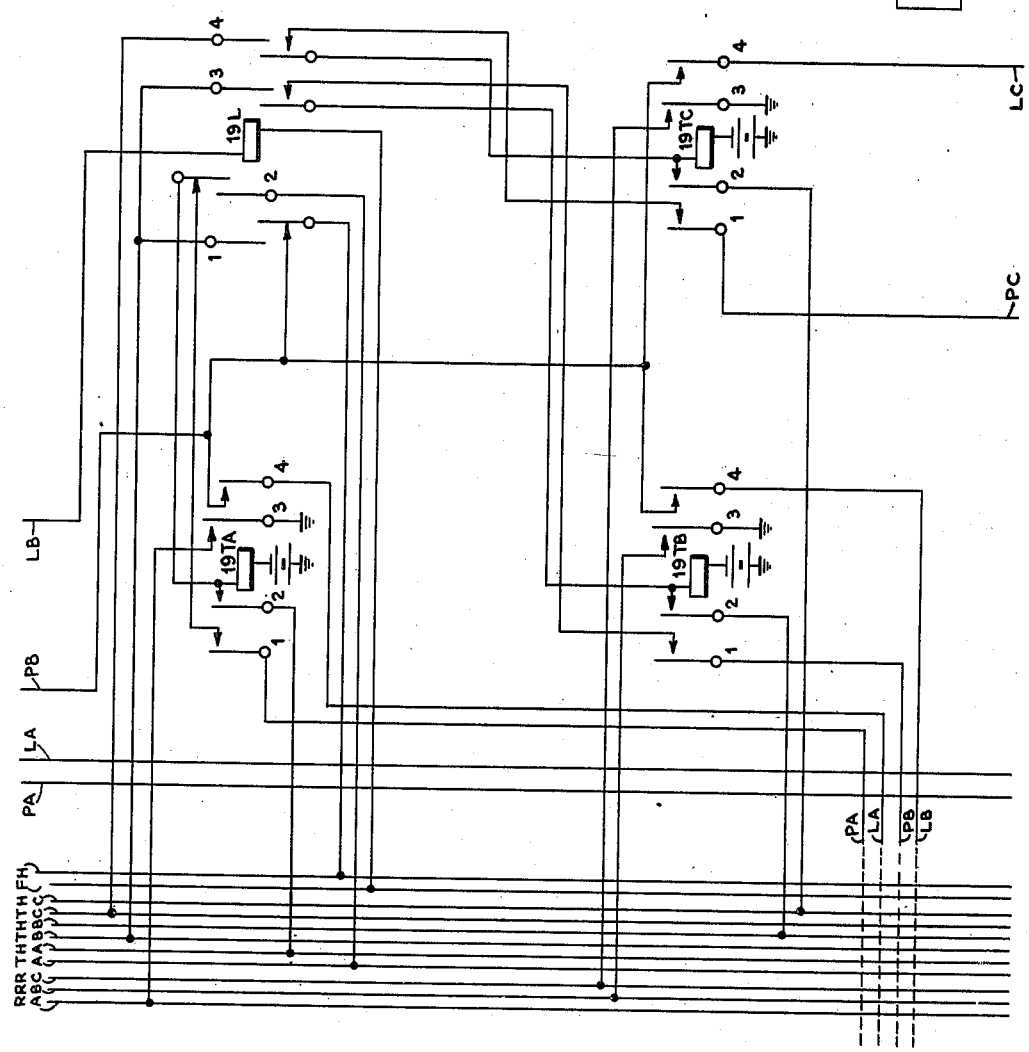

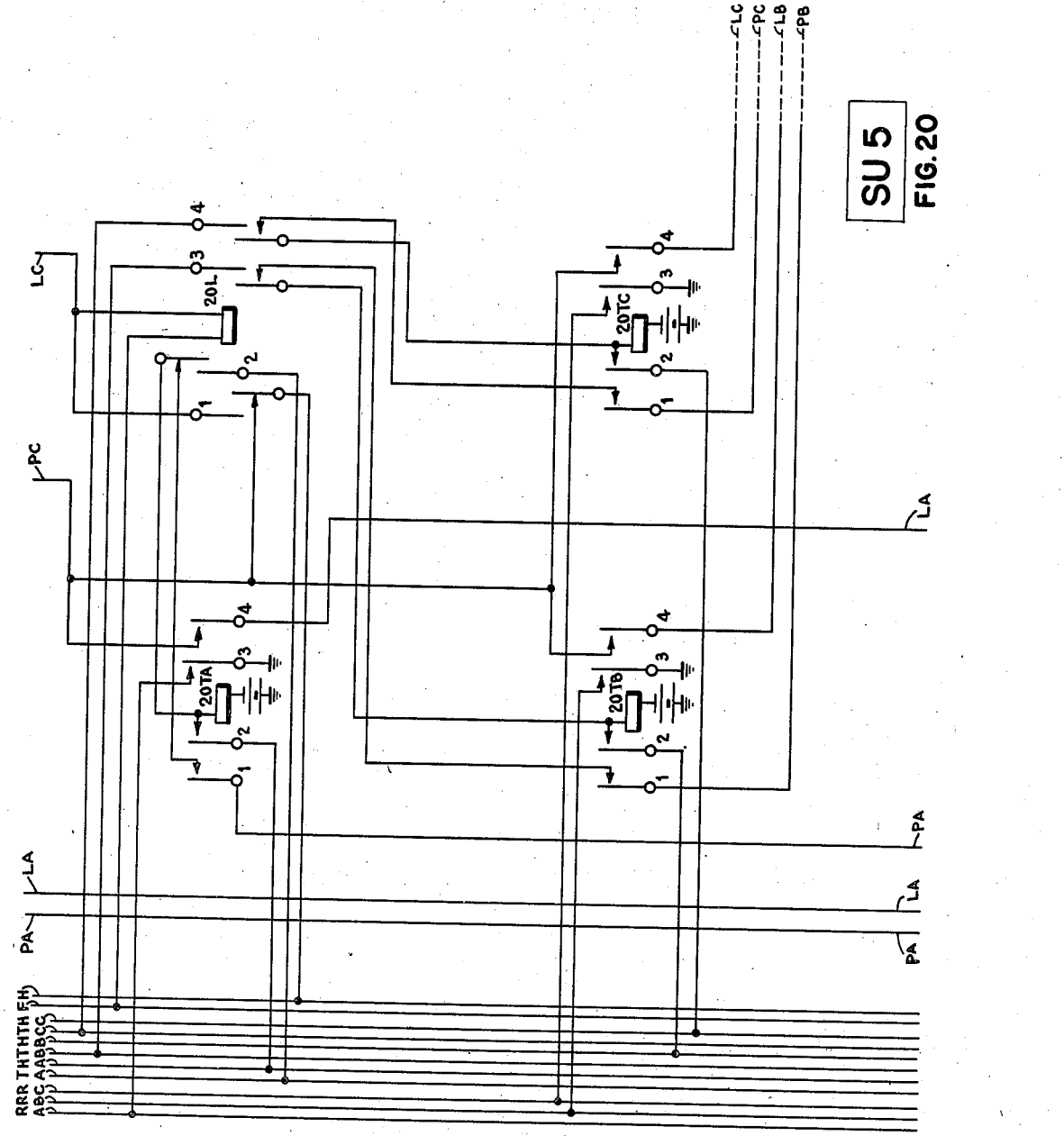

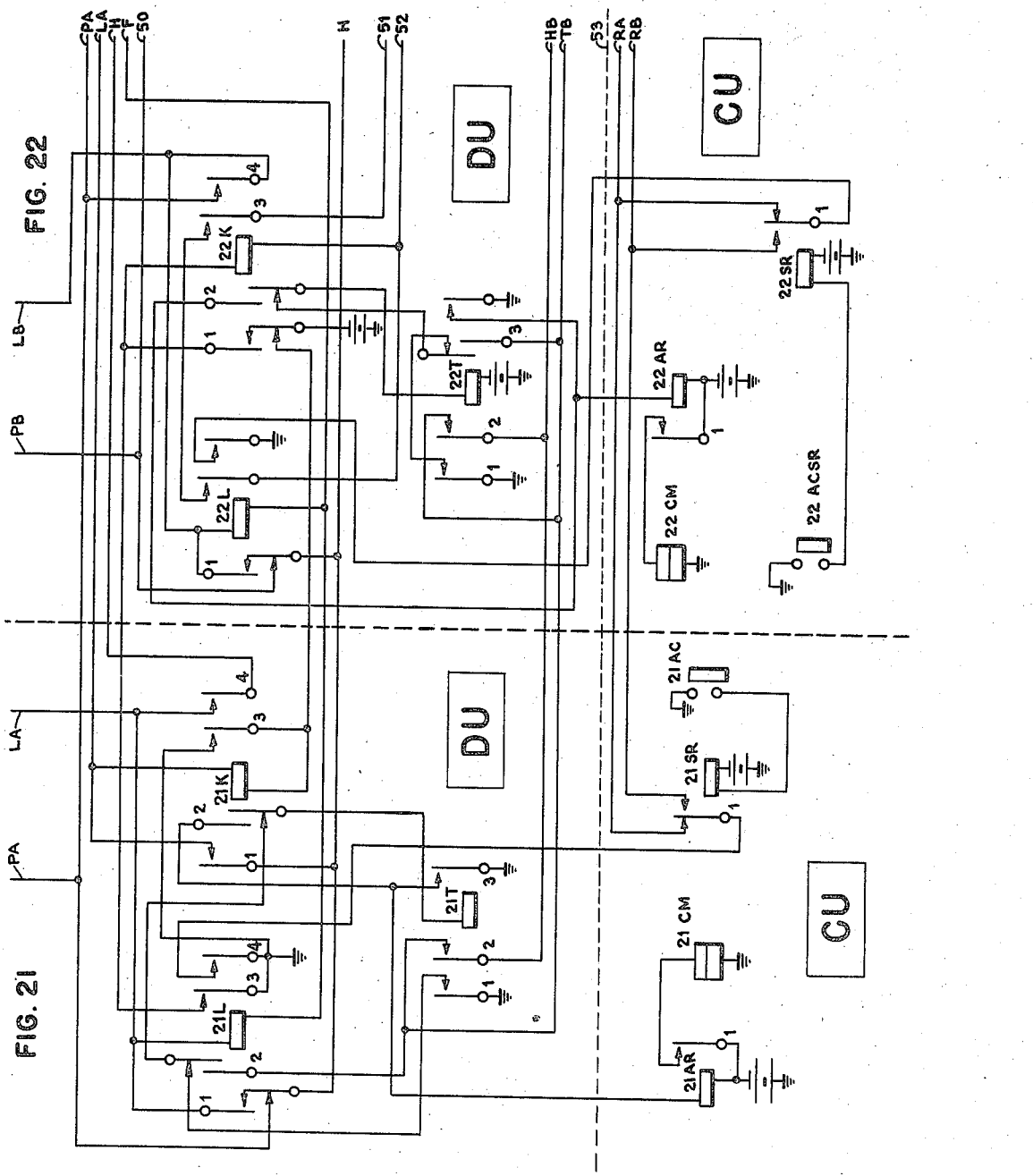

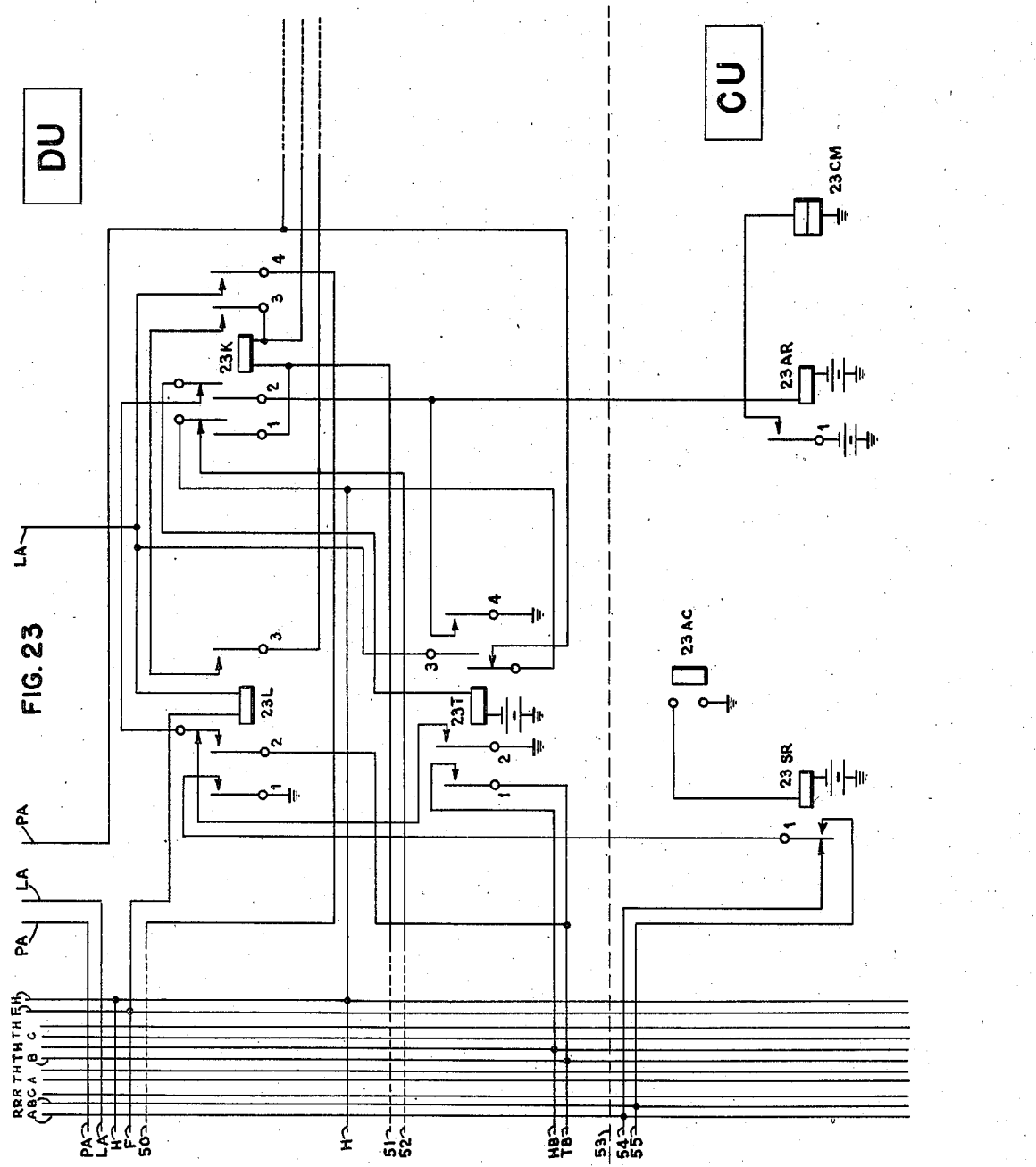

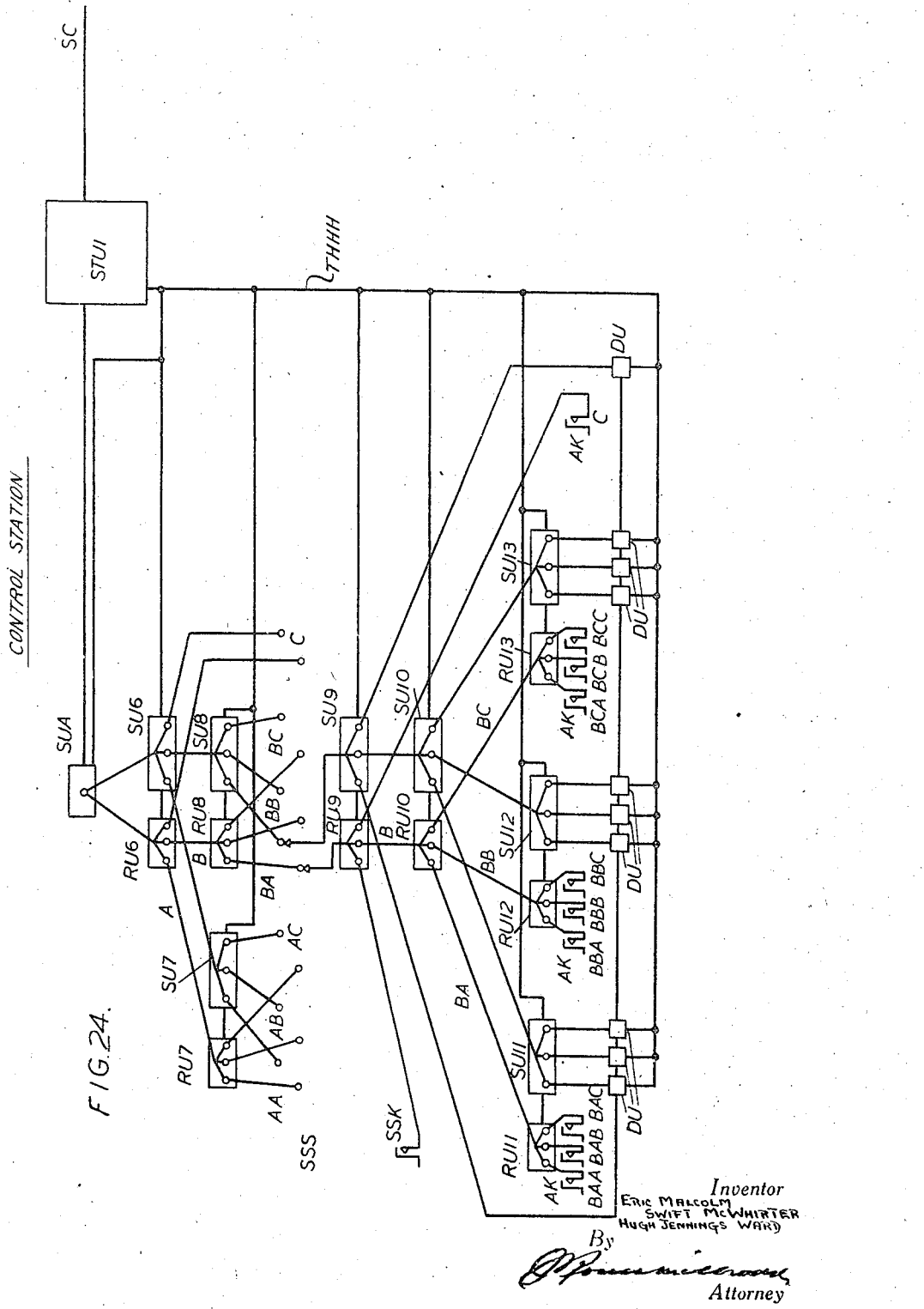

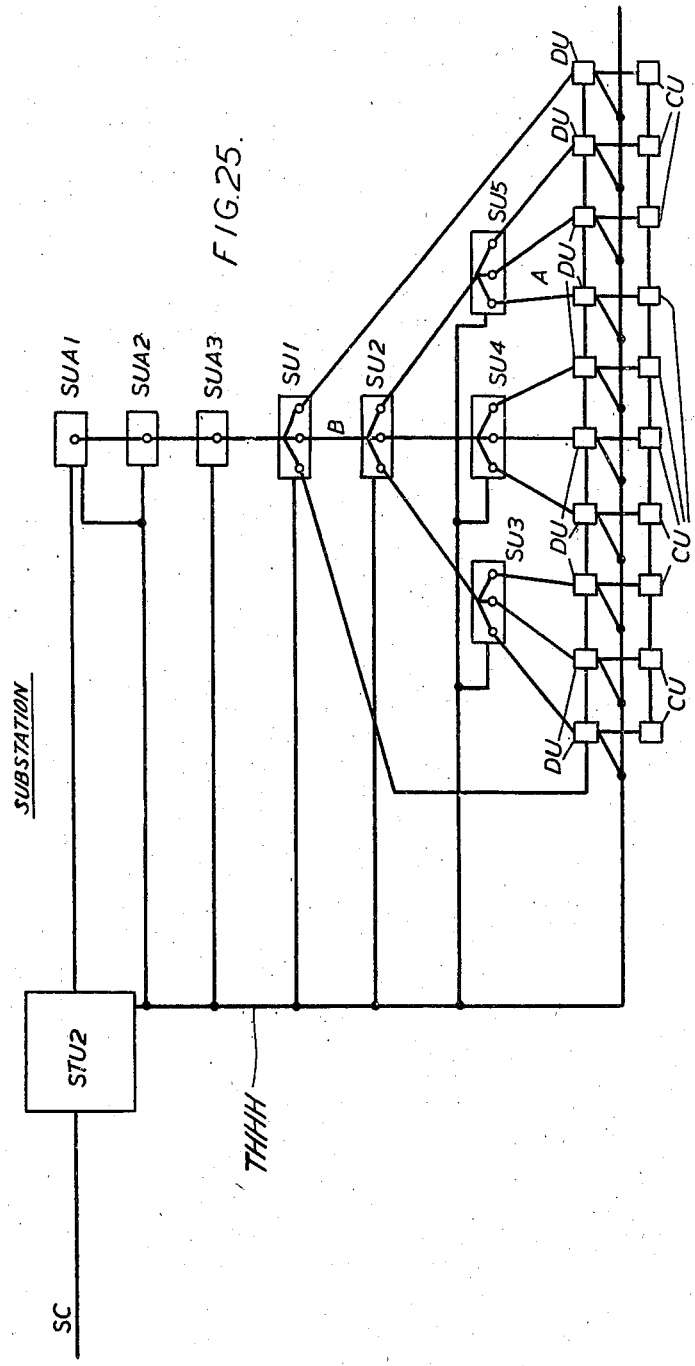

Patented Nov. 2, 1948

2,452,590

UNITED STATES PATENT OFFICE 2,452,590

ELECTRIC SIGNALING SYSTEM

Eric Malcolm Swift McWhirter and Hugh Jennings Ward, London, England, assignors to Standard Telephones and Cables Limited, London, England, a British company Application January 8, 1945, Serial No. 571,862
In Great Britain December 24, 1943

7 Claims. (Cl. 177—353)

This invention relates to electric selective signalling systems for remote control and indication purposes.

An object of the invention is to provide such a system comprising a number of similar selection units whereby the system may be readily adapted for any particular layout of the apparatus to be controlled.

The invention is primarily intended for the remote control of airfield lighting in which, for example, facilities may be provided for controlling the lighting of one or more flare paths, taxi tracks, approach floods, traffic lights, control lights, etc., from a control station. The invention is, however, generally applicable to remote control systems.

A further object of the invention is to provide a system having a number of sub-stations connected in parallel to a line extending from the control station and in which each piece of apparatus to be controlled at any particular sub-station (such as the switches for controlling the aforesaid lights) is connected selectively to the common line through a series of unit selectors, each of which unit selectors acts in response to a signal which selects it to extend the circuit from the control station through to another unit selector until the particular piece of apparatus is selected.

A further object of the invention is to provide such a selective control system in which selection is obtained by transmitting pulses of one polarity to one or the other wire of a two-wire line or to both of the wires in parallel whereby three possible selections for each type of pulse are obtained, the unit selectors being so arranged that when one of them responds to a pulse, it extends the circuit from the control station to any one of three further unit selectors, and the selected one of these unit selectors in response to a further pulse selects any one of three further unit selectors or control units according to the number of selecting stages involved.

A further object of the invention is to provide such a system in which each selection unit, as it is taken into use, is arranged to transmit a checking pulse of opposite polarity back to the control station so that the further transmission of pulses from the control station is dependent upon the proper stage-by-stage selection of apparatus at the sub-station in accordance with the transmitted code. The checking pulses being of opposite polarity to the controlling pulses, interference between sub-stations is rendered impossible.

The invention will be described with reference to the accompanying drawings in which Figs. 1 to 14 show the circuits at the control station, and Figs. 15 to 23 show the circuits at a sub-station. Figs. 24 and 25 illustrate diagrammatically the general arrangement of the equipment at the control station and one sub-station respectively, and Fig. 26 is a diagram showing how the circuits of Figs. 1 to 23 should be arranged.

In the circuit diagrams each relay is given a number prefix corresponding with the figure of the drawings on which it appears. Thus, a reference to relay 2R will indicate that this relay is to be found on Fig. 2, or a reference to relay 15R will indicate that relay 15R is on Fig. 15. In describing the relay contacts, a similar numbering scheme is used, the relay designation being quoted in small letters together with the number of the relay contact referred to, followed by "front" or "back" indicating whether the relay is in operated or unoperated condition.

Thus, to take a simple example, referring to polarized relays 15P and 15Q in the signalling and translating unit STU2, Fig. 15. Assume relays 2A and 2R have been operated, negative potential is connected from battery 2xy over 2a1 front, 2r1 front, wire 101 of the line SC, 15r1, back, winding of 15P to positive potential. If 2B or 2R are operated, the circuit is from battery 2xy over 2b1 front, 2r2 front, wire 102, 15r2 back, winding of 15Q to positive. If 2C and 2R are operated, the circuit is from battery 2xy over 2c1 front, 2r1 front, wire 101, 15r1 back, winding of 15P to positive, and over 2c2 front, 2r2 front, wire 102, 15r2 back winding of 15Q to positive. Thus, it will be seen that the operation of 2A causes the operation of 15P, the operation of 2B causes the operation of 15Q and the operation of 2C causes the operation of 15P and 15Q. As will be seen later, the circuits above described are the fundamental circuits of the code signalling used in the system, but the main purpose in describing them here is to explain the system of notation used in the specification. This system of designating the relays and their contacts has been used throughout the circuits, and it will be found that reference to the various figures is thereby considerably facilitated.

General description of the system

A complete system consists of a control station and a number of sub-stations at which control is to be effected.

The control station and all the sub-stations are connected in parallel on a two-wire line circuit with earth return (or third wire return).

Signalling from the control station to the sub-station is by short pulses of negative potential on either or both wires of the line. There are thus three kinds of pulse which will be referred to as A, B, C. Signalling in the reverse direction from sub-station to control station is by short pulses of positive potential on either or both wires of the line. In this way sub-stations can never signal to one another.

Every pulse sent out from the control station is followed by a check pulse sent in from a substation. These two pulses must agree, e. g. a pulse sent out on the A wire must be followed by a check pulse sent in on the A wire.

The three kinds of pulse A, B, C, enable selection to be made progressively on a radix of 3. Consequently, each selection circuit has three outlets.

Selection is made by a selection circuit marking its three outlets from one pulse and then from the next pulse, selecting one of the three outlets and causing the selection circuit so selected to mark its three outlets.

A train of pulses consists of three parts:

(1) A C pulse to prepare all sub-stations for reception, (2) A sub-station selection, (3) A selection and operation of a particular piece of equipment.

Referring now to the Control station diagram Fig. 24, STU1 is the signalling and translating circuit. It puts the outgoing pulses on the two wire line SC and receives the incoming pulses translating them into markings on the multiple THHH.

SSS is a hand operated switch for selecting the sub-station to which signals are to be sent. It has two moving contacts or wipers and may be turned to any of seven sets of bank contacts AA, AB, AC, BA, BB, BC, C representing seven substations. It is shown on contacts BA. The bank contacts lead to routing circuits and selection circuits.

RU7, RU8 form a rank of routing circuits which will cause the second pulse of the required sub-station code to be sent. RU6 is a routing circuit which will cause the first pulse of the required sub-station code to be sent.

SU7, SU8 form a rank of selection circuits which respond to the second check pulse of the required sub-station code. SU6 is a selection circuit which responds to the first check pulse of the required sub-station code. SUA responds to the check C pulse which prepared all sub-stations.

The wipers of switch SSS lead to further routing and selection circuits for dealing with the code for the particular piece of equipment to be selected and controlled.

The keys AK, each labelled with its code are the individual operating keys for each piece of equipment, and each has an associated display unit DU comprising lamps or other indicators to illustrate the condition of the equipment at the sub-station. These keys fall naturally into groups of three according to their coding, each group of three connecting with the appropriate routing unit in the last rank while the display units, in similar groups of three connect with the corresponding selection unit in the last rank.

The AK key and Display unit coded C, connect with a higher rank on account of the code containing only one letter instead of three.

The key SSK which connects with the top rank of routing units is used for sending a code which will result in the sub-station sending back a check of the position of all the equipment at that station.

THHH represents the multiple marking wires over which the circuit STU1 marks all selection and display units as required.

At the sub-station Fig. 25 the circuits are very similar in function to those at the control station. For simplicity the drawing shows one sub-station on the line SC but as above indicated there would be in practice several such sub-stations.

STU2 is the signalling and translating circuit which receives the incoming pulses and translates them into markings on the multiple THHH.

SUA2 and SUA3 respond to the particular sub-station code and the various SU selection units respond to the equipment code according to the rank in which they are situated.

DU and CU represent the Display and control circuits of each individual equipment to be controlled at the sub-station.

Apart from preselection of the sub-station by switch SSS further selection and operation is effected by multiple marking and relay operation. Selection units and, at the control station, routing units are in associated groups of three, one such unit connecting to three others and each of those three connecting to three more, thus building up a pyramid of units with one unit at the apex and each rank multiplying by three until there are sufficient in the bottom rank of the pyramid to cater for the equipments to be controlled.

The expression "ranks of the pyramid" is used to refer to one selection stage of circuits as shown in Figs. 24 and 25 and as referred to above. It is assumed that there are several substations, all connected in parallel to the common two wire line SC, only one sub-station being indicated in the drawing. The apparatus at this sub-station comprises a plurality of similar selection units SUA and SU. The signals to be received over the two wire line SC are of three different kinds, which are referred to as A, B and C.

Thus the A signals consist of a pulse over one wire, B signals a pulse over the wire and C signals a pulse over both wires. A signalling and translating unit, STU2 which is shown in detail in Fig. 15 receives the signals from the line SC and translates them into a marking potential which is applied to one of three wires (RA, RB or RC, Figs. 15 and 16) according to the kind of signal. These wires, together with other wires presently to be referred to, form a multiple which is indicated by the line THHH connected to all the selection units SUA and SU, and to display units DU, also described later with reference to Figs. 16 to 23. A preliminary signal of the C kind is effective to cause the first selection unit SUA1 to condition the second such selection unit SUA2 to respond to a further signal. The second and the third selection units SUA 2 and SUA3 serve to determine that the first two selection signals characterise the particular substation in question. It will be assumed that these signals are of kinds B and A respectively. In response to signal B the second selection unit SUA2 prepares the third such unit SUA3 to respond to the next signal. If the signal be C or A further signals will have no further effect. Assuming the signal to be of the kind B, the third selection unit SUA3 responds to a signal A to prepare a selection unit SU1 to respond to further signals.

Selection units SU are adapted to respond to signals of any of the three kinds and each such unit has, therefore, three outlets over any one of which, according to the kind of received signal, it may prepare a further selection unit to respond to the next signal. In the case of the topmost selection unit SU1 shown in Fig. 25, however, the left hand outlet goes to the left hand display unit DU for a purpose to be explained later. The middle outlet goes to a further selection unit SU2 and the third outlet might also go to a selection unit SU but is shown as extending directly to a display unit DU.

Assuming that the signal received by the topmost selection unit SU1 is of the kind B, the selection unit SU2 is prepared for operation. In response to the next following signal a further selection unit SU3, SU4 or SU5 is prepared for responding to the still next signal. If it be assumed that the selection unit SU2 receives a signal of kind C, SU5 is prepared for operation. In response to the next following signal SU5 prepares one of the display units DU connected to it to respond to control signals. There is a display unit DU individual to each piece of apparatus to be controlled. It may be assumed that the apparatus to be controlled is either a lamp or a circuit breaker, that the control signals are of two kinds only, which may be for example, A and B denoting "on" and "off" or in and out respectively. The display unit operates a control unit CU in response to the control signal in order to carry out the desired control.

It should be noted that the signals operative upon any of the selection units SUA or SU or upon the display units DU go in every case direct from the signal and translating unit STU2 to the particular unit concerned over the multiple THHH. This avoids a serious defect in prior systems in which selection is effected over a pyramid arrangement of selection circuits, for in such systems, any control circuit comprised a large number of relay contacts, the number increasing as the system increased in size. In the present system the number of relay contacts involved in a control circuit is always the same i. e. a minimum, no matter how far the system is extended.

As previously stated the selection units SUA have one outlet only, but they are similar to the selection units SU differing therefrom only in the omission of the relays responsive to the undesired markings and of the outlets corresponding to those relays.

It has been pointed out above that the selection units SUA2 and SUA3 respond only to the series of signals distinctive of the particular substation shown and if that series be received selection unit SU1 is conditioned to respond to a further signal. As has also been previously stated the left hand outlet of selection unit SU1 is taken directly to the left hand display unit DU. A chain circuit connects all the display units from left to right. If, after the particular substation shown has been selected, a signal of kind A is received, the first display unit is conditioned to respond to a further signal, in such a manner that it sends back a signal indicating the state of its apparatus and prepares the next display unit to respond to a further signal. A signal of kind A following upon a series of signals that selects a substation is reserved for the case in which a check is required to be made of the condition of all the apparatus at the substation.

Thus selection unit SU1 has only two outlets to further selection units. If there are only two pieces of apparatus at a substation these outlets can lead directly to respectively display units. If, as in the case shown there are more than two pieces of apparatus at the substation, one or both of the outlets from SU1 leads to a further selection unit. In Fig. 25 one of the outlets is shown going to a further selection unit SU2 and one directly to a display unit. The selection unit SU2 has three outlets to further selection units SU3, SU4 and SU5 each of which has three outlets, each to a display unit DU, thus providing for nine pieces of apparatus to be controlled plus one prepared for control directly from SU1, a total of ten. If the number of pieces of apparatus increases, it is evident how further selection units may be added to cater for them. The flexibility of the system is thus evident. The outlet from one selection unit is connected to the input of a further selection unit always in the same manner so that the wiring problems present no complexities. It is evident also that, the same number of signals is not always required to select a piece of apparatus, and in the same way one substation may be selected by less or more signals than required for another.

Each selection unit SUA or SU is effective, on receiving a signal of a particular kind, to cause the signal and translation unit STU2 to repeat back to the control station a signal of the kind proper to the selection performed. The purpose and effect of this will be described after describing the arrangements at the control station, Fig. 24. At the control station there is provided a series of keys AK and associated with each key AK a display unit DU. The keys AK and display units DU are provided in number equal to the largest number of apparatus at any one substation, one key AK and one display unit DU for each such piece of apparatus. In addition there is a switch SSS for selection of any substation out of the number of substations connected to the line SC.

The line SC is connected to a signalling and translation unit STU1 (shown in detail in Fig. 2) similar to the unit STU2 Fig. 25, and there is a pyramid of selection units SUA and SU connected to the signalling and translation unit in a similar manner to the pyramid of selection units at the substation. These selection units are shown in Figs. 1, 4 and 6. Each selection unit SU is however, associated with a routing unit RU shown in Figs. 3 and 5. A pyramid of routing units RU9, RU10, RU11, RU12 and RU13 connects the keys AK to movable contacts of the substation selecting switch SSS and the pyramid of associated selecting units SU9 to SU13 connects the display units similarly to moveable contacts of the same switch SSS. These routing and selection units are shown in Figs. 7 to 12, and two of the display units in Figs. 13 and 14. The fixed contacts of the switch SSS are connected through a pyramid of routing and selection units RU6, RU7, RU8, SU6, SU7 and SU8 to the signal and translation unit STU1.

The switch SSS having been set for selection of a particular substation, any given key AK is connected through a distinctive series of routing units to the signal and translation unit STU1 and the corresponding display unit through a corresponding distinctive series of selection units SU and SUA. Actuation of a key AK causes a circuit to be set up through the routing units to the signalling and translation unit STU1 and causes that unit to send out a preliminary station selecting signal of kind C. At the substation, Fig. 25, this signal causes the selective unit SUA1 to condition selective unit SUA2 for operation and to send back a signal of kind C. This signal when received at the control station Fig. 24 causes the selective unit SUA to condition the selective unit SU6 to respond to a further signal and also causes the routing unit RU6 associated with selection unit SU6 to act on the signalling and translation unit STU1 to cause a signal to be sent over the line SC of a kind distinctive of the unit RU6.

At the substation, Fig. 25 the last-mentioned signal is effective on selection unit SUA2 to cause it to select SUA3 for subsequent operation and to send back a signal indicative of this selection, which signal is conveniently the same kind as received. When this signal is received at the control station Fig. 24 it causes selective unit SU6 to condition a further selective unit for operation, but only if this received signal indicates that the selection determined by routing unit RU6 associated with selection unit SU6 has taken place correctly is a further routing unit conditioned for sending out a signal.

In order to understand further the manner in which a series of signals is prepared, each of the keys AK has been denoted in Fig. 24 by the combination of kinds of signal which characterises that key and its corresponding display unit DU within a substation. The leads from routing units RU11, RU12 and RU13 to routing unit RU10 and from this last routing unit to RU9 have also been denoted by a characteristic combination of signals, viz. BA, BB, BC, B. Similarly the leads from fixed contacts of the substation selecting switch SSS to RU7, RU8 and RU6 have been denoted by the combination of signals that characterises each substation, viz. AA, AB, AC, BA, BB, BC, and the leads from routing units RU7 and RU8 to routing unit RU6 have been denoted by the kind of signal that characterises these leads, viz. A and B. Consider the substation proper to the fixed contacts of switch SSS on which the moveable contacts are resting and the apparatus proper to the key AK denoted BCA within that substation. Then the combination of signals needed to select that piece of apparatus is BABCA. Actuation of the key AK proper to this piece of apparatus must therefore set up this combination of signals to be transmitted, and this is done in the reverse order. That is to say, routing unit RU13 is prepared to send out signal A; routing unit RU10 is prepared to send out signal C and routing unit RU9 to send out signal B. Routing unit RU8 is prepared to send out signal A and routing unit RU6 to send out signal B. Actuation of any key AK to effect a particular control also prepares for the sending out of a signal of the kind proper to the control to be effected and this signal is sent following the selection signals.

*Detail description of circuits*

Turning now to the detailed circuits, Fig. 11 shows a routing unit corresponding to the routing unit RU13 of Fig. 24 and Fig. 12 shows its attached selecting unit SU13. Leads from these two units are shown as connected via leads $a$, $b$, $c$, $d$, Fig. 12, to terminals marked BCA in Fig. 14. BCA denotes the combination of signals for selection of the piece of apparatus within a substation to which key 14 AK, Fig. 14, is individual. Fig. 14 shows a display unit belonging to that key. The key 14 AK is shown for simplicity of connections as two keys marked "on" and "off," one of these being actuated to cause the corresponding apparatus (assumed to be a circuit breaker or a lamp) to be controlled in the appropriate way, i. e. to close or open an electric circuit in the case of a circuit breaker or to be lit or extinguished in the case of a lamp. Fig. 14 shows also sets of terminals marked BCB and BCC to which other leads from the routing and selecting units shown in Figs. 11 and 12 are connected via leads $e$, $f$, $g$, $h$ and $i$, $j$, $k$, $l$ and also a set of terminals marked C to which leads from a routing unit shown in Fig. 7 and a selecting unit shown in Fig. 8 are connected, these last mentioned units corresponding to units RU9 and SU9 respectively of Fig. 24. There is a key and a display unit (not shown) individual to each of these sets of terminals BCB, BCC and C and connected thereto in exactly the same manner as key 14AK and the display unit in that figure are connected to terminals BCA.

Assume that key 14 AK has been actuated either to "on" or "off" position. In either case positive potential is connected from closed contacts of the key 14 AK, over the left hand terminal of the set of terminals BCA, lead $a$, lead 48, Fig. 11, to relay 11CA, Fig. 11, and negative potential. Relay 11CA operates and positive potential is connected over 11ca1 front, 11cb1 back, 11cc1 back, lead KC, to relay 9CC, Fig. 9, and negative potential. Relay 9CC operates and positive potential is connected over 9cc1 front, lead KB, to relay 7CB and negative potential. Relay 7CB operates. (The wires connected to the relays CA, CB and CC respectively in each routing unit are denoted KA, KB and KC.)

Figure 7:
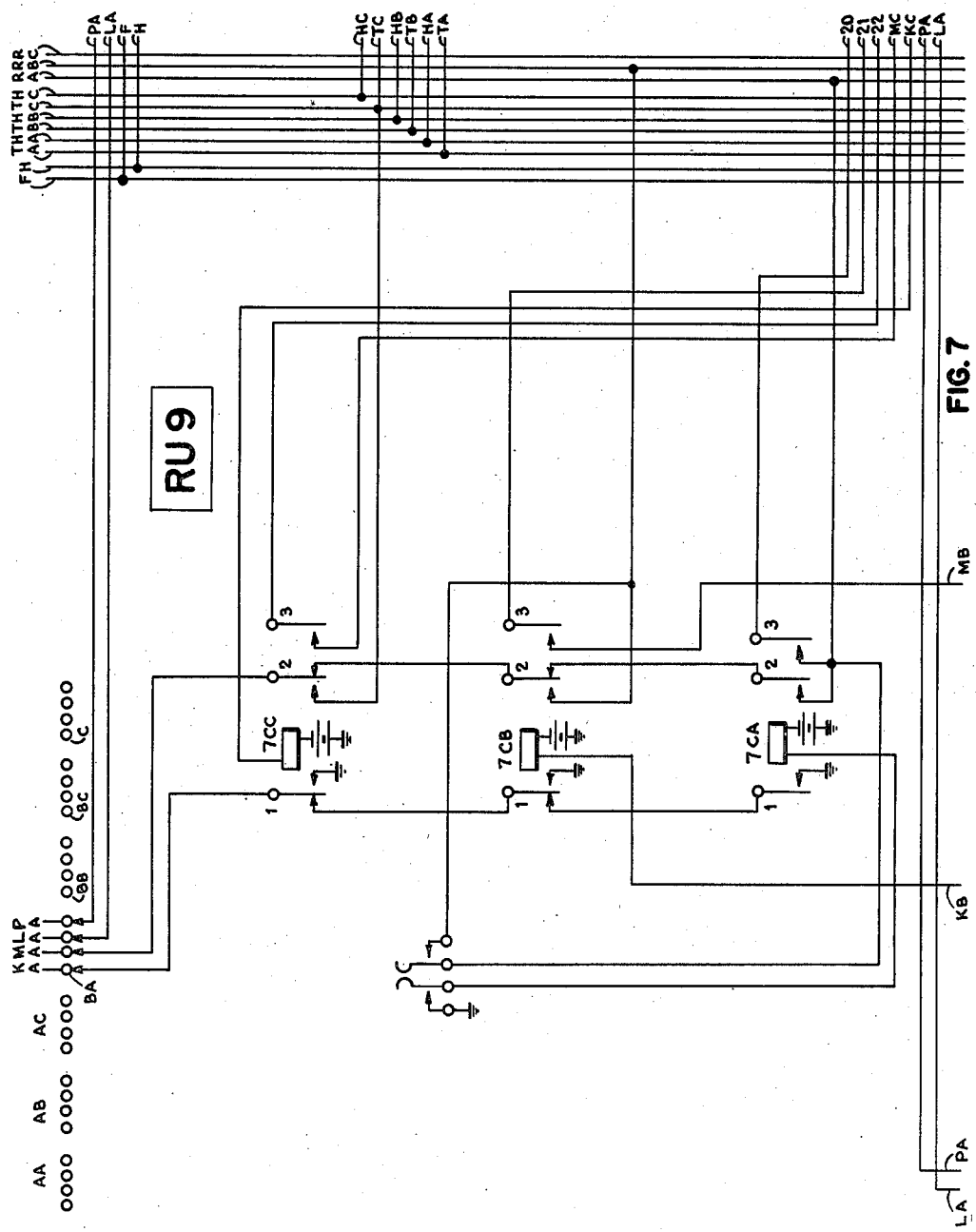
Figure 8:
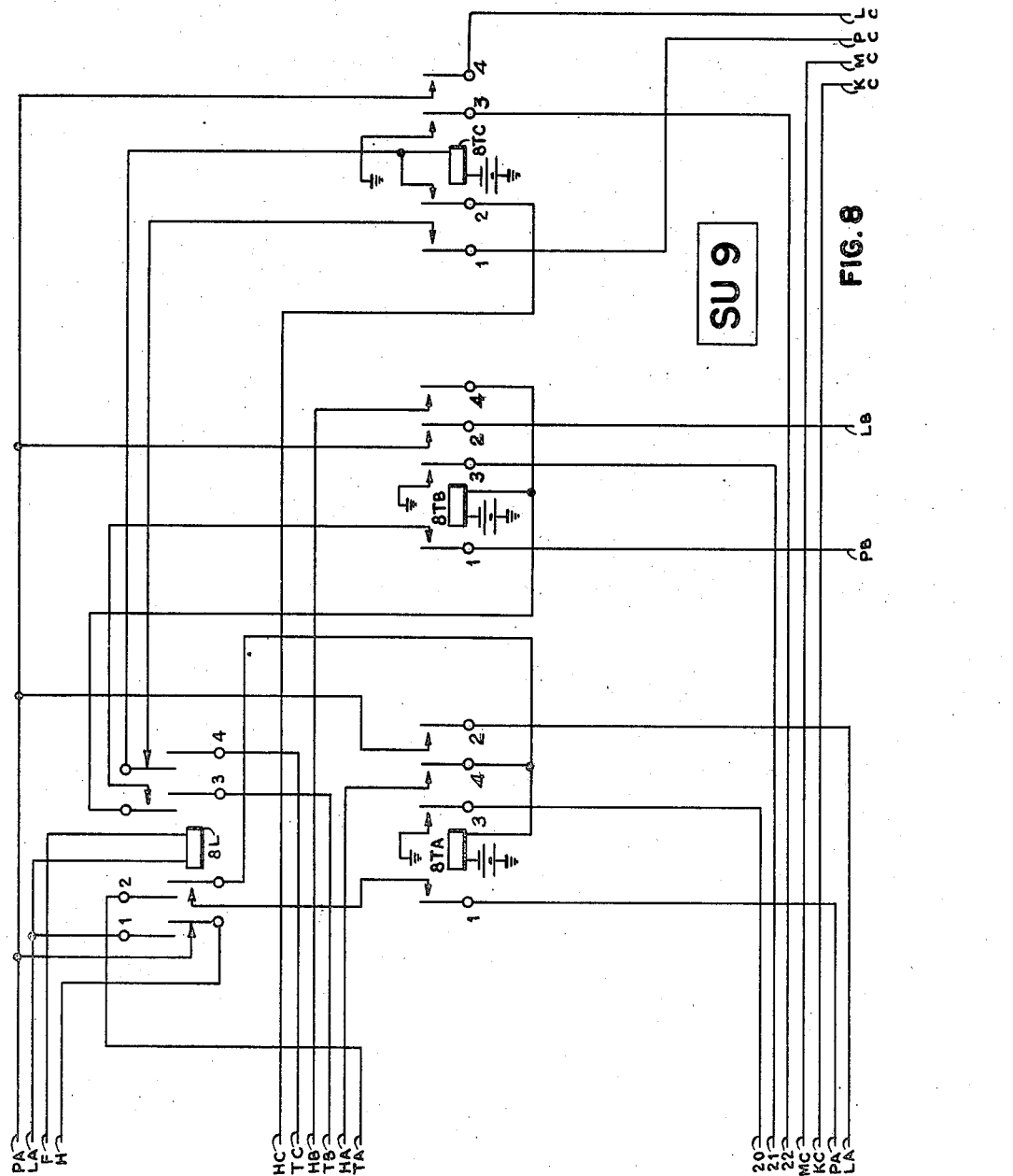

Fig. 7 shows the substation selecting switch SSS and it is assumed that the moveable contacts of this switch have been set on the set of fixed contacts marked BA. When relay 7CB operates, positive potential is thus connected over 7cb1 front, 7cc1 back, contacts of switch SSS, lead KA, to relay 5CA, Fig. 5, and negative potential. Relay 5CA operates and positive potential is connected over 5ca1 front, 5cb1 back, 5cc1 back, lead KB, to relay 3CB, Fig. 3, and negative potential. Relay 3CB operates. Positive potential is connected over 3cb1 front, 3cc1 back, to a wire marked H which is connected to the selection unit shown in Fig. 1 corresponding to selection unit SUA of Fig. 24 and to the signal and translation unit shown in Fig. 2 corresponding to unit STU1 of Fig. 24.

Figure 2:
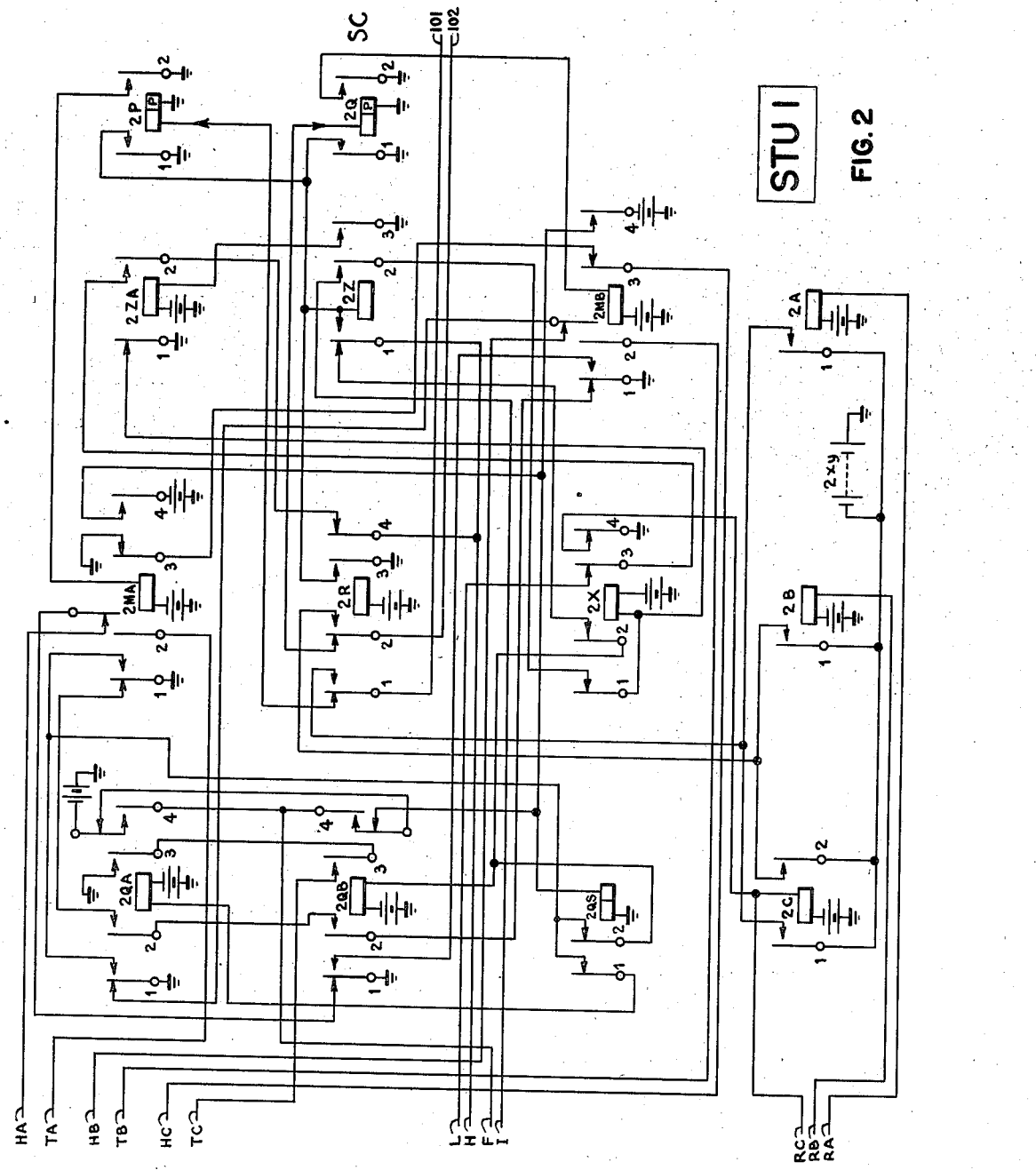

Attention is now directed to Fig. 2. Certain of the relays are, however, normally operated. Relay 2QS is normally operated over 2qb4 back and 2qa4 back to battery. Relay 2X is normally operated over 2za1 back. Relay 2C is normally operated over 2x4 front. The effect of application of positive potential to the H wire is therefore to operate relay 2QB over 2z1 back, 2x2 front, to winding of 2QB and negative. A circuit is completed for relay 2R from positive, 2mb1 back, 2qb2 front, winding of 2R to negative. Relay 2R operates its contacts 2r1 and 2r2 and thus negative potential from battery 2xy is connected over 2c1 front and 2r1 front to the upper wire 101 of the line SC and over 2c2 front and 2r2 front to the lower wire 102 of the line SC. The operation of relay 2QB breaks the circuit of relay QS at contacts 2qb4 and also connects at these contacts from 2qa4 back, negative potential to the wire F of the multiple connecting the signalling and translation unit, Fig. 2, to the different selection units. Relay QS is slow to release and therefore remains operated for the time being. Relay 2R in operating closes an obvious circuit for relay 2Z over 2r3 which in turn operates 2ZA also in an obvious circuit over 2z3. The application of negative potential to wire F has no effect at this time. The opening of contacts 2za1 opens the circuit of normally operated relay 2X, but a locking circuit for this relay remains closed over 2x1 front and 2z2 front, lead 1, IL1 back, Fig. 1, to positive on wire H. Opening of contacts 2z1 releases relay 2QB, which by opening contacts 2qb4, recloses the circuit for QS and removes negative potential from the F wire. Relay 2R releases on the opening of contacts 2qb2 and at contacts 2r3 opens the circuit of relay 2Z, which, however, remains locked over 2z1 front to positive on the H wire. Release of 2R brings the signal sent to an end.

The signal sent over the line SC is effective at the signalling and translation unit STU2 of all substations, in operating relays 15P and 15Q, Fig. 15, over leads 101 and 102 and back contacts 15r1 and 2, respectively. These two relays are polarised so as to be operated only upon the flow of current in the respective directions indicated by the arrows and the application of negative potential to the wires of the line SC causes such currents to flow over contacts 15r1 back, winding of relay 15P to earth and over 15r2 back, winding of relay 15Q to earth.

The circuits of Fig. 15 are similar to those of Fig. 2, the differences being slight. Relays 15X and 15QS are normally operated. When relays 15P and 15Q operate, they close circuits for 15MA and 15MB over front contacts 15p1 and 15q1 respectively. Relay 15Z is operated over 15p2 and 15q2 front in multiple. Relay 15Z, in operating in multiple, connects positive potential over 15z1 front to wire H leading to Fig. 16 and also operates 15ZA in an obvious circuit over 15z3. The circuit of 15X is broken by the opening of contacts 15za1 but it remains locked over 15x1 front, 15z2 front, lead P, 16L1 back, Fig. 16, to positive potential on wire H.

In Fig. 15 are shown wires H, F, RA, RB, RC, TA, HA, TB, HB, TC, HC leading to Fig. 16 and thence to other figures representing units at the substations. Wires similarly denoted are shown in Figs. 1 and 2 at the control station. The same designations have been used for wires at the control station and at the substation and it is believed that no confusion will arise because of the use of the same designations at the two stations if it be remembered that the only wires connecting the two stations are those of the line SC. The use of the same designations in the two cases will, on the contrary, be useful since two wires with the same designation have the same function.

The operation of relays 15MA and 15MB in multiple causes the operation of relays 15QA and 15QB, over contacts 15ma1 front, and 15qs1 front for relay 15QA and over 15mb1 front and 15qs2 front for relay 15QB and these relays lock to 15qa1 and 15qb1 front respectively. The operation of relays 15QA and 15QB also breaks the circuit of relay 15QS (new circuits being reclosed at 15ma4 and 15mb4), and over 15qa4 front and 15qb4 front negative potential is applied to the wire F leading to Fig. 16 and also to all other selection units at the sub-station. There is now a circuit for relay 16L, Fig. 16, from negative on wire F, winding of 16L, lead L, 15x3 front, wire H and positive. Relay 16L operates and at contacts 16L1 locks itself to positive on wire H independently of relay X. At contacts 16L2 it closes an operating circuit for relay 16TC, from negative, winding of 16TC, 16L2 front, lead TC, 15qb3 front, 15qa3 front, positive. At front contacts 16tc3 an obvious circuit is closed over lead RC for relay 15C, which operates. The operation of relay 16L breaks the holding circuit for relay 15X, which releases.

When the signal from the control station ceases, relays 15P and 15Q release and cause the release of relays 15MA and 15MB. Relays 15QA and 15QB remain locked over 15qs1 front, 15qa1 front and over 15qs2 front, 15qb1 front respectively. Circuits are closed for relay 15R over 15ma1 back, 15qa2 front, and 15mb1 back, 15qb2 front. A corresponding signal to that received, i.e. a signal of kind C, is sent back to the control station. In this case positive potential is connected to the upper wire 101 of the line SC over 15c1 front and 15r1 front and to the lower wire 102 of the line SC over 15c2 front and 15r2 front.

It will be noted that signalling from the control station to the substation takes place by the application of negative potential to the line, whilst signalling from a substation to the control station takes place by application of positive potential to the line. The relays 15P and 15Q and corresponding relays at other substations are polarised so that the relays at any one substation do not respond to signals from other substations but respond only to signals from the control circuit.

When relays 15MA and 15MB release on cessation of the signal from the control station the circuit of 15QS is finally broken and that relay commences to release. After an interval, relay 15QS releases and breaks the circuit of relays 15QA and 15QB which release. Several consequences follow: (1) the original operating circuit of 16TC is broken, but this relay remains locked over 16tc2 front, lead HC, 15mb3 back, 15ma3 back; (2) the circuit of relay 15R is broken and this relay releases reconnecting relays 15P and 15Q to the line SC and bringing the transmitted signal to an end; at the same time, the circuit of relay 15Z is broken, but this relay is slow to release; (3) negative potential is removed from wire F at contacts 15qa4 and 15qb4; relay 16L therefore releases; relay 15QS reoperates over back contacts 15qb4 and 15qa4. (4) Relay 16TC has another holding circuit from negative, winding 16TC, 16L2 back, 16tc1 front, lead P, 17Lb1 back, Fig. 17, wire H, 15z1 front, positive. (5) Positive potential on wire H is extended over 16L1 back, 16tc4 front, lead L, to one side of relay 17LB to prepare that relay for operation when negative potential is again applied to wire F.

The selection unit shown in Fig. 16 corresponds to the selection unit SUA1 of Fig. 25 and by its response to a signal of the kind C it has prepared the selection unit shown in Fig. 17, which corresponds to the selection unit SUA2 of Fig. 25, for response to the next following signal.

At the control station, Fig. 2, the signal back from the sub-station operates both relays 2P and 2Q. These relays are polarised to respond to currents in the directions of the arrows. Relays 2P and 2Q operate relays 2MA and 2MB over front contacts 2p2 and 2q2, respectively, which in turn operate 2QA and 2QB as follows: battery, winding 2QA, 2qs1 front, 2ma1 front to ground; and battery, winding 2QB, 2qs2 front, 2mb1 to ground. These last mentioned relays lock to 2qa1 and 2qb1 front respectively over contacts 2qs1 and 2qs2 respectively. At 2qa4 front and 2qb4 front the original circuit for 2QS is broken, but new circuits for this relay are completed over 2ma4 front and 2mb4 front. Closure of contacts 2qa4 front and 2qb4 front also applies negative potential to wire F (Fig. 1), whilst positive potential is applied to wire TC Fig. 1 over 2qa3 front and 2qb3 front. A circuit is completed for relay 1L from negative on wire F, winding of relay 1L lead L to Fig. 2, 2x3 front, 2za2 front, 2r4 back, wire H and positive. Relay 1L in operating breaks the circuit of relay 2X at contacts 1L1 and at those contacts locks itself to wire H. Relay 2X releases and releases relay 2C which was held over 2x4 front. In response to the signal of kind C relay 1TC now operates from negative, winding of 1TC, 1L2 front, lead TC, 2qb3 front, 2qa3 front.

When the signal from the sub-station ceases, relays 2P and 2Q release, followed by 2MA and 2MB. These two relays complete a locking circuit for 1TC over 1tc2 front, lead HC, 2mb3 back, 2ma3 back to positive. The circuit of relay 2QS is broken, at contacts 2ma4 and 2mb4 and that relay commences to release. The operating circuits for 2QA and 2QB are broken but these relays hold for the time being over contacts of QS and their own front contacts 2qa1 and 2qb1 respectively. Relay 2R operates over 2ma1 back, 2qa2 front and over 2mb1 back, 2qb2 front.

With relay 1TC operated, positive is extended over 1tc3 front, wire M and front contacts of one of the relays 3CA, 3CB, 3CC to one of the wires RA, RB, RC. In the example assumed relay 3CB is operated and thus this positive potential is extended over 3cc2 back, 3cb2 front to wire RB and thus to relay 2B and negative. This relay operates and at contacts 2b1 front connects negative potential from battery 2xy over contacts 2r2 front to the lower wire 102 of the line SC to send a signal of kind B to the substation.

After an interval relay 2QS releases and breaks the locking circuits of relays 2QA and 2QB. These relays release and at contacts 2qa4 and 2qb4 remove negative potential from wire F and reclose the circuit for relay 2QS which operates, again. The removal of negative potential from wire F breaks the circuit of relay 1L which releases. The positive potential on wire H is now extended over 1L1 back, 1tc4, front wire L to one side of winding 4L preparing that relay for operation when negative potential shall again be applied to wire F.

The signal of kind B received at the substation, Fig. 15 operates relay 15Q. 15MB is operated over 15q1, followed by 15QB over 15qs2 and 15mb1. The circuit of 15QS is broken at 15qb4 front and negative potential is applied over those contacts to wire F. A new circuit for 15QS is closed over 15mb4 and 15QS remains operated.

Relay 15MB at contacts 15mb3 breaks the locking circuit for relay 16TC. That relay, however, temporarily holds over 16L2 back, 16tc1 front, wire P, 17Lb1 back, to positive on the H wire.

When negative potential is applied to wire F, relay 17LB operates, as it has been prepared for operation by application of positive potential from the H wire over 16tc4 front. When relay 17LB operates it breaks the temporary holding circuit of relay 16TC which releases and thus breaks the original operating circuit for relay 17LB, but that relay now holds over its own front contacts 17Lb1 to provide potential on the H wire. At contacts 17Lb2 it completes an operating circuit for relay 17TB from negative, winding of 17TB, 17Lb2 front, wire TB, 15mb2 front, 15qa1 back to positive.

The circuits in the upper half of Fig. 17 correspond to the selection unit SUA2 of Fig. 25 and are adapted to respond only to a signal of kind B. Hence relay 17TB is connected over front contacts of 17LB to the wire marked TB and is only operated if relay 15MB is operated, and relays 15MA, and 15QA are not operated. Wires outgoing from one selection unit SUA to another unit SUA or SU and incoming to the latter are marked P and L.

When relays 2QA and 2QB at the control station released, relay 2R released and relays 2P and 2Q were reconnected to the line SC, and the signal from the control station ceases. Relay 15Q opens its contacts, relay 15MB releases and operates 15R. Relay 17TB locks over 17tb2 front over wire HB, 15mb2 back, 15qa1 back to positive. Positive is applied over 17tb3 front, wire RB to relay 15B which operates to send back to the control station via 15r2 front and wire 102 a signal of the same kind B as that received. The circuit of 15QS is opened and this relay releases after an interval followed by release of 15QB, removal of negative potential from the wire F and consequent release of 17LB and reoperation of 15QS.

At the control station, Fig. 2, relay 2Q operates its contacts and the sequence of relay operations and releases takes place in a manner similar to that previously described. This time relays 2MB and 2QB operate. Application of negative potential to wire F results in the operation of relay 4L which, at front contacts 4L2, 4L3, 4L4 respectively connects relays 4TA, 4TB and 4TC to the respective wires TA, TB, TC. Since 2MB is operated and 2QA not operated, relay 4TB is operated over 413 front, wire TB 2mb2 front and 2qa1 back.

Figure 3:
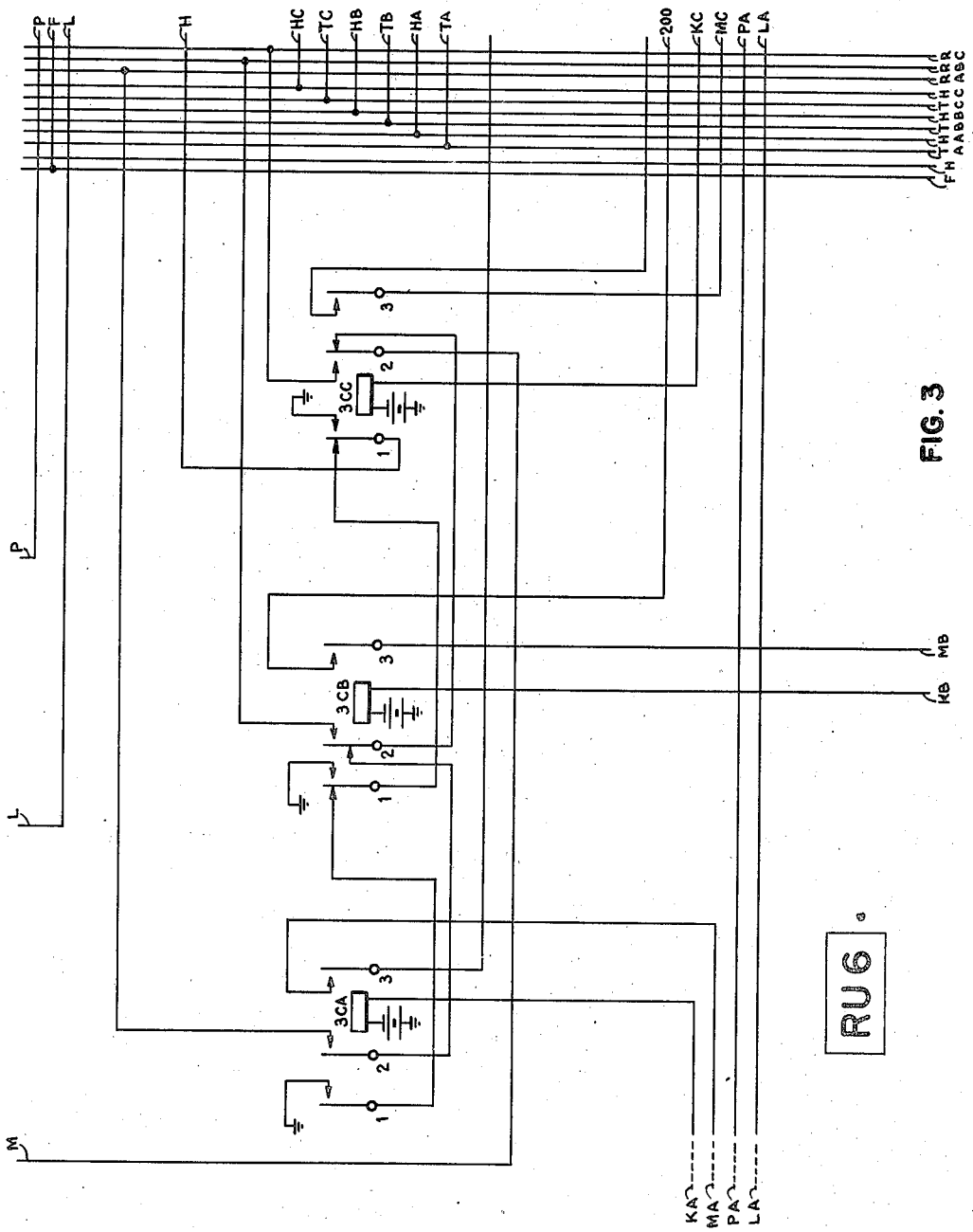
Figure 4:
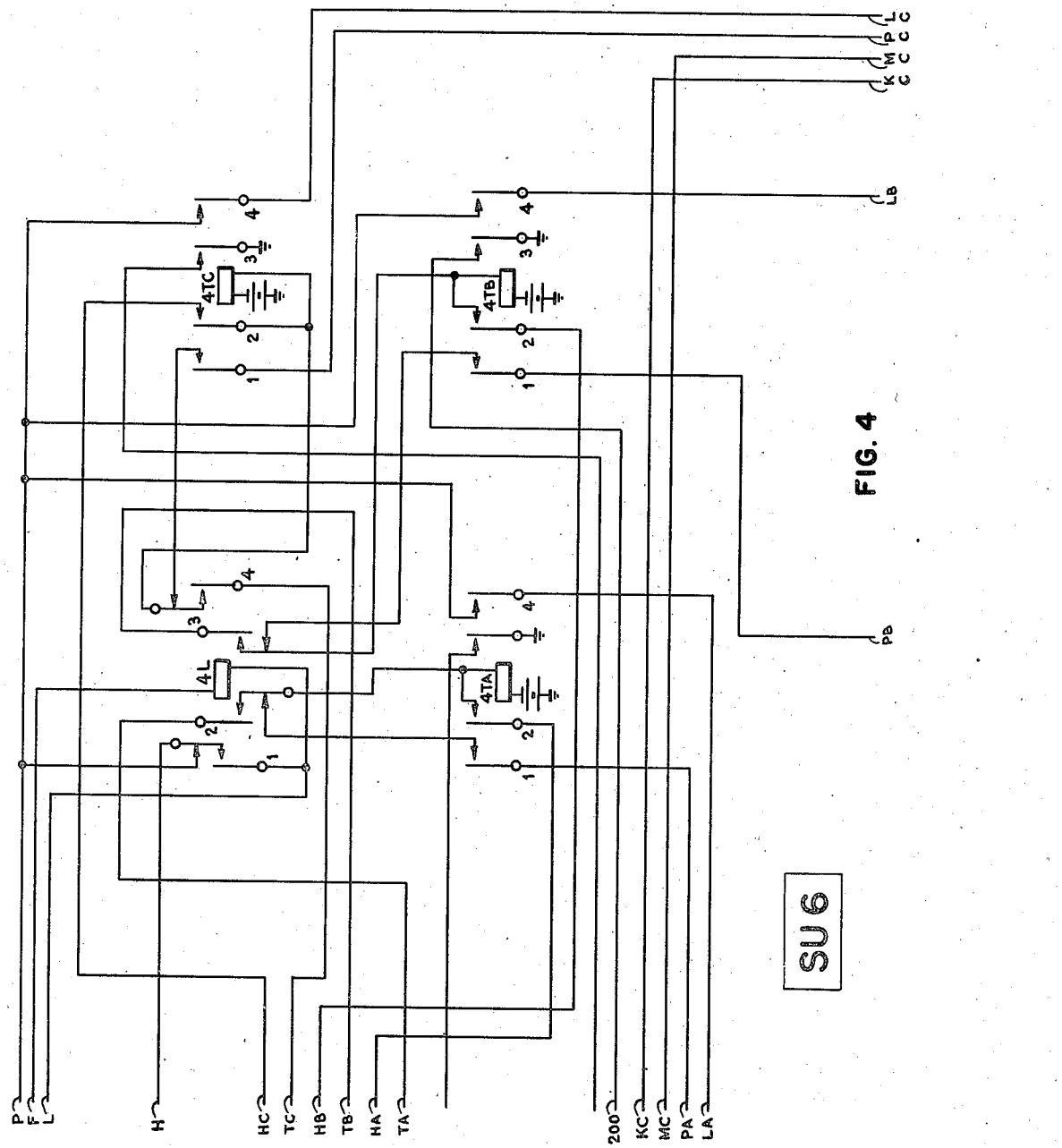

The circuits of Fig. 4 correspond to the selection unit SU6 of Fig. 24 and those of Fig. 3 to the routing unit RU6. Since the selection unit SU6 has received back from the substation a signal indicating that the selection unit SUA2 has correctly performed a selection in response to the signal sent out under control of the routing unit RU6, associated with selection unit SU6, relays 4TB and 3CB both being operated, positive potential is extended over 4tb3 front, wire 200, 3cb3 front, wire MB Figs. 3 and 5 and a first contact of one of the relays 5CA, 5CB or 5CC to send out the next signal from the control station to the substation. Since relay 5CA is operated, positive potential is extended from 4tb3 front, wire 200, 3cb3, wire MB over 5cc2 back, 5cb2 back, 5ca2 front to wire RA to operate relay 2A and cause a signal of kind A to be sent out from the control station.

The operation of a selection unit at the substation in response to a signal from the control station to condition a further selection unit for operation and to send back to the control station a signal indicating the selection performed is clear from the above description as is also the operation of a selection unit at the control station in response to the signal sent back from the substation and the manner in which the circuits are conditioned to send out the next signal. The further operations of the selection units at the substation and of the routing and selection units at the control station need therefore only be briefly described.

The signal of kind A received at the substation results in the operation of relays 15P, 15MA and 15QA. The previous operation of 17TB has prepared 17LA of the next selection unit for operation when potential is applied to wire F positive potential, the H wire being connected over 17lb1 back 17tb4 front to one side of 17LA and this last mentioned relay connects 17TA to the wire TA for response to the signal of kind A. Relay 17TA prepares relay 18L for subsequent operation over wire L and at its front contacts 17ta3 operates 15A over wire RA to send back a signal of kind A to the control station. The selection unit in the lower half of Fig. 17 corresponds to selection unit SUA3 of Fig. 25.

At the control station, relay 4TB has extended positive potential on wire H over 411 back, 4tb4 front, wire LB to relay 6L which operates when negative potential is applied to the F wire and then relay 6TA operates in response to the signal of the kind A, releasing 6L. Since this signal indicates that selection unit SUA3 has correctly responded and 7CB is in operated condition to prepare the next signal, positive potential is connected over 6ta3 front, wire SA 5ca3 front, 7ca2 back, 7cb2 front to wire RB to operate relay 2B to send out a signal of kind B.

At the substation relay 18L is operated when negative potential is applied to the F wire and connects up relays 18TA, 18TB and 18TC for operation by the next signal releasing 17TA. Relay 18TB is operated, 18L is released and relay 15B operated to send back a signal of kind B. Relay 19L is prepared for operation.

At the control station, operation of 6TA has prepared relay 8L for operation by extending positive potential on the H wire and over 6l1 back over 6ta4 front, wire LA contacts of switch SSS wire L to relay 8L and when negative potential is placed on the F wire that relay operates and connects relays 8TA, 8TB and 8TC for response to the incoming signal. Relay 8TB responds to a signal of kind B and operates. Positive potential over 8tb3 front, wire 21, 7cb3 front, wire MB, 9cc2 front wire RC operates 2C to send out the next signal of kind C.

At the substation relay 19L operates when negative potential is connected to the F wire and connects 19TA, 19TB and 19TC for response to the incoming signal. Relay 19TC operates and extends positive on wire H, over 19l1 bank, 19tc4 front wire LC to relay 20L to prepare it for operation. Relay 19TC at front contacts 19tc3 extends positive potential to wire RC and operates relay 15C to send back a signal of kind C to the control station.

At the control station, the circuit of relay 10L has been prepared for operation when relay 8TB operated and now in response to the signal of kind C relay 10L operates, relay 10TC operates and with 9CC and 11CA in operated condition, positive is extended over 10tc3 front, wire 37 9cc3 front, wire MC 11cc2 back, 11cb2 back, 11ca2 front wire RA to operate relay 2A to send out a signal of kind A. At the same time relay 12L is prepared for operation by the extension of positive potential in the H wire over 10l1 back, 10tc4 font wire LC to relay 12L.

At the substation 20L operates when negative potential is connected to the F wire and connects up 20TA, 20TB and 20TC to respond to the received signal. A received signal of kind A causes the operation of relay 20TA and when 20L is released positive potential on the H wire is extended over 20l1 back, 20ta4 front wire LB to prepare relay 23L for operation. At contacts 20ta3 positive potential is connected to the wire RA to operate relay 15A to cause a signal of kind A to be returned to the control station.

At the control station relay 12L operates when negative potential is applied to the F wire and connects up 12TA, 12TB and 12TC to respond to the incoming signal. Relay 12TA responds to a signal of kind A and when 12L releases, extends positive potential on the H wire over 12l1 back, 12ta4 front, wire C to relay 14L to prepare it for operation.

The relay 14L at the control station is part of a display unit corresponding to the key 14AK and the next signal sent out depends upon whether the key has been actuated to "on" or "off." The relay 23L at the substation is part of a corresponding display unit at the substation.

It will be seen that Figs. 3, 5, 7, 9 and 11 show the circuits of the routing units RU6, RU8, RU9, RU10 and RU13 of Fig. 24 whilst Figs. 4, 6, 8, 10 and 12 show the circuits of the associated selection units SU6, SU8, SU9, SU10 and SU13 of Fig. 24. By the actuation of key 14AK a distinctive path is set up through the pyramid of routing units, this path involving the routing units mentioned. The signals sent out as a consequence of the path set up over the routing units select first the particular substation required and then a corresponding path downward through the selection units at the substation. The selection units shown in Figs. 18, 19 and 20 correspond to the selection units SU1, SU2 and SU5 of Fig. 25. Two wires lead from each of the selection units shown in Figs. 16 and 17 to the selection unit in the next rank of the pyramid and these wires are marked P and L respectively in the lower part of each unit and in the upper part of the next selection unit. The selection units shown in Figs. 18, 19 and 20 have each three outlet pairs which are marked PA, LA; PB, LB and PC, LC. The outlet pair PA, LA from Fig. 18 leads straight to the display unit shown in Fig. 21 and will be referred to later. Since the selection unit SU1 of Fig. 18 responds to a signal of kind B the outlet selected in response to this signal is marked PB, LB and leads to the selection unit of Fig. 19. The outlet PC, LC is shown as going off to the right of the figure and reference to Fig. 25 will show that it goes directly to the right hand display unit shown in that figure. These wires connect to the display unit in exactly the same way as the outlets from Fig. 20 connect to a display unit and the effect of the latter will be explained later.

The outlets from Fig. 19 are marked in the same manner as those from Fig. 18. The outlets PA, LA and PB, LB are shown as going to the left of the figure and are connected to selection units SU3 and SU4 of Fig. 25. Outlet PC, LC is connected to the selection unit SU5, viz: that shown in Fig. 20.

The outlets from Fig. 20 are similarly marked. They go to different display units. Figs. 21 and 22 show the two first display units whilst Fig. 23 shows the display unit selected by the operations detailed above.

At the control station the selection units shown in Figs. 4, 6, 8, 10 and 12 have outlets which are also all marked similarly and in the same manner as the outputs from the selection units of Figs. 18, 19 and 20. The outlet from a selection unit goes to that selection unit associated with a routing unit from which the corresponding connection goes to the routing unit associated with the first mentioned selection unit. Thus the selection unit of Fig. 4 is associated with the routing unit of Fig. 3. The routing unit of Fig. 3 is conditioned by the operation therein of relay 3CB to cause a signal of kind B to be sent out. It is so conditioned by a circuit completed over a connection from the routing unit of Fig. 5. In consequence the outlet PB, LB from the selection unit of Fig. 4 leads to the selection unit of Fig. 6 which is associated with the routing unit of Fig. 5. The input connections to a routing unit shown at the bottom of a figure thus correspond with the output connections from the associated selection unit. There are three such sets of input and output connections and these are marked KA, MA, PA, LA; KB, MB, PB, LB; KC, MC, PC, LC respectively. The routing and selection units connected to the wires KA, MA, PA, LA shown at the bottom left hand corner of Fig. 3 are not described in detail but correspond to the units RU7 and SU7 of Fig. 24. The connections KB, MB, PB and LB from Figs. 3 and 4 go to the routing and selection units shown in detail in Figs. 5 and 6 respectively corresponding to RU8 and SU8 of Fig. 24, whilst the connections KC, MC, PC and LC are shown as going through Figs. 6 and 5 to fixed contacts marked C of the substation selecting switch SSS Fig. 7. The fixed contacts of this switch are marked with designations denoting the combinations of kinds of signal required to select the corresponding substation.

Figure 5:
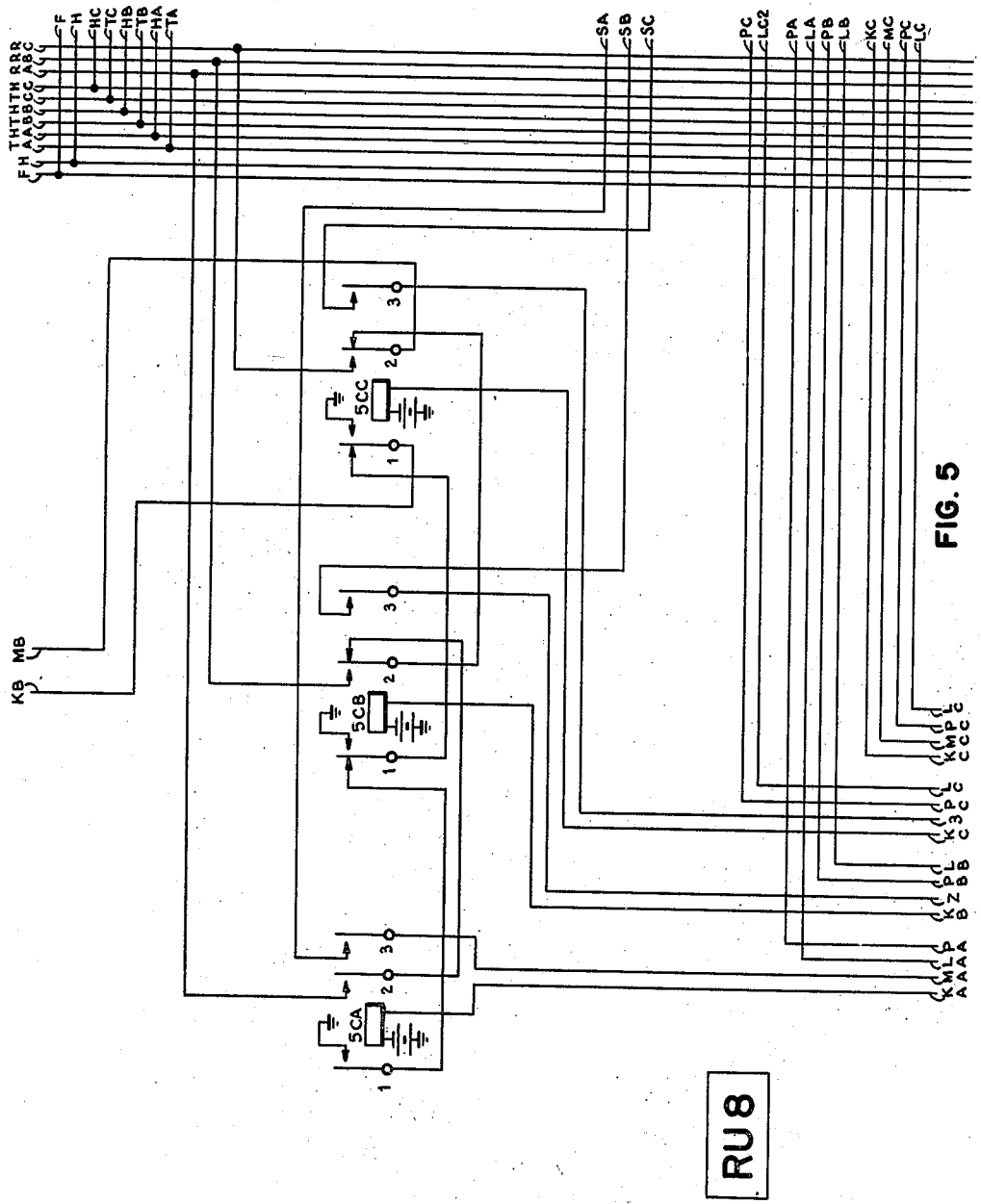
Figure 6:
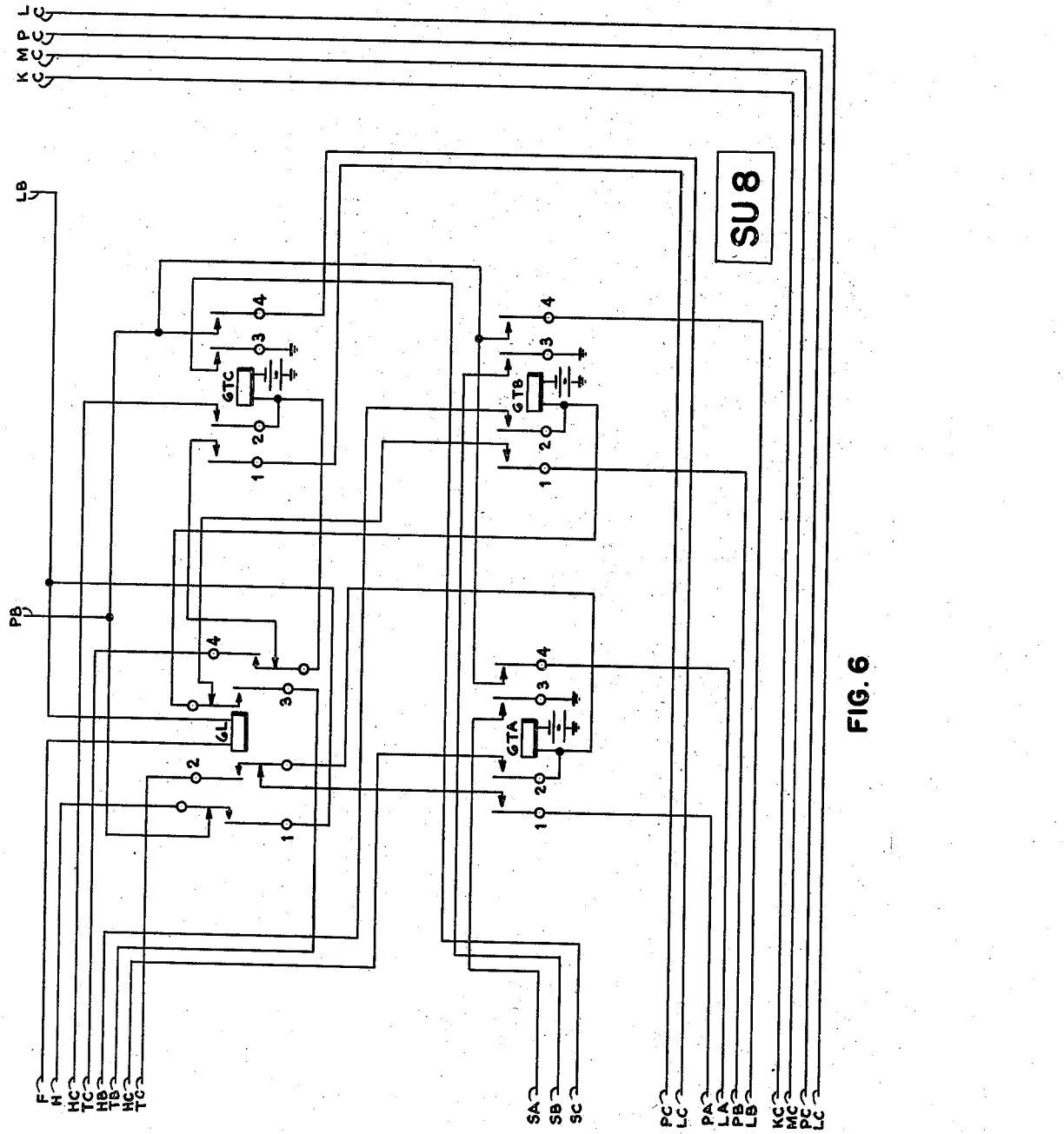

In the case of the routing and selection units shown in Figs. 5 and 6 the connections go to contacts of the substation selecting switch. The connections from Figs. 7 and 8 corresponding to the units RU9 and SU9 of Fig. 24 to the lower units of the pyramid are similarly marked to those from Figs. 3 and 4. Two wires KA and MA of one connection go to relay contacts associated with a substation key SSK, the other two wires PA and LA of the same connection go to the selection unit SU9 from which wires PA and LA go to the first display unit Fig. 13. Another connection KB, MB, PB and LB goes to Figs. 9 and 10 corresponding to units RU10 and SU10 of Fig. 24 whilst the third connection KC, MC, PC and LC is taken to terminal C in Fig. 14.

Figure 9:
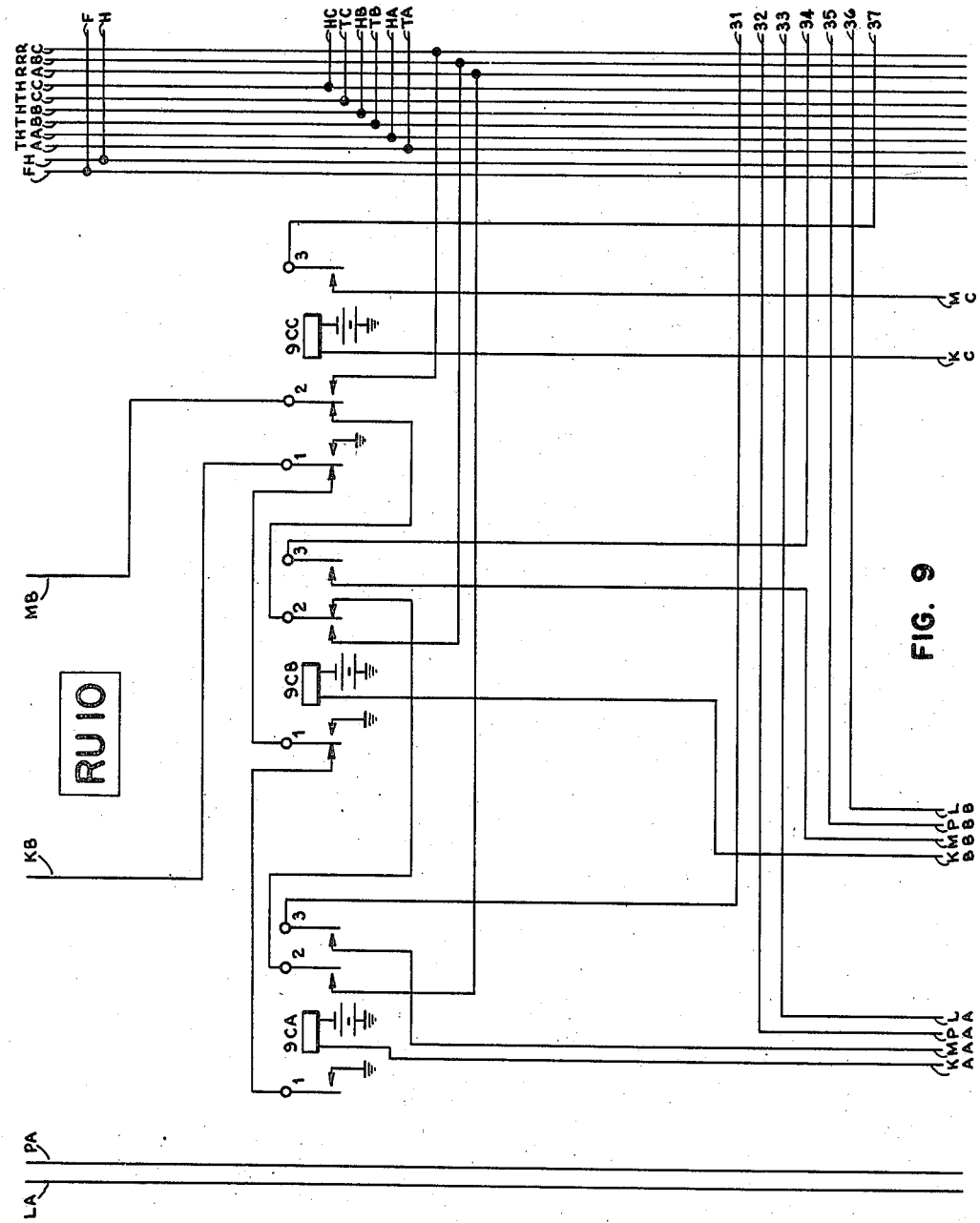
Figure 10:
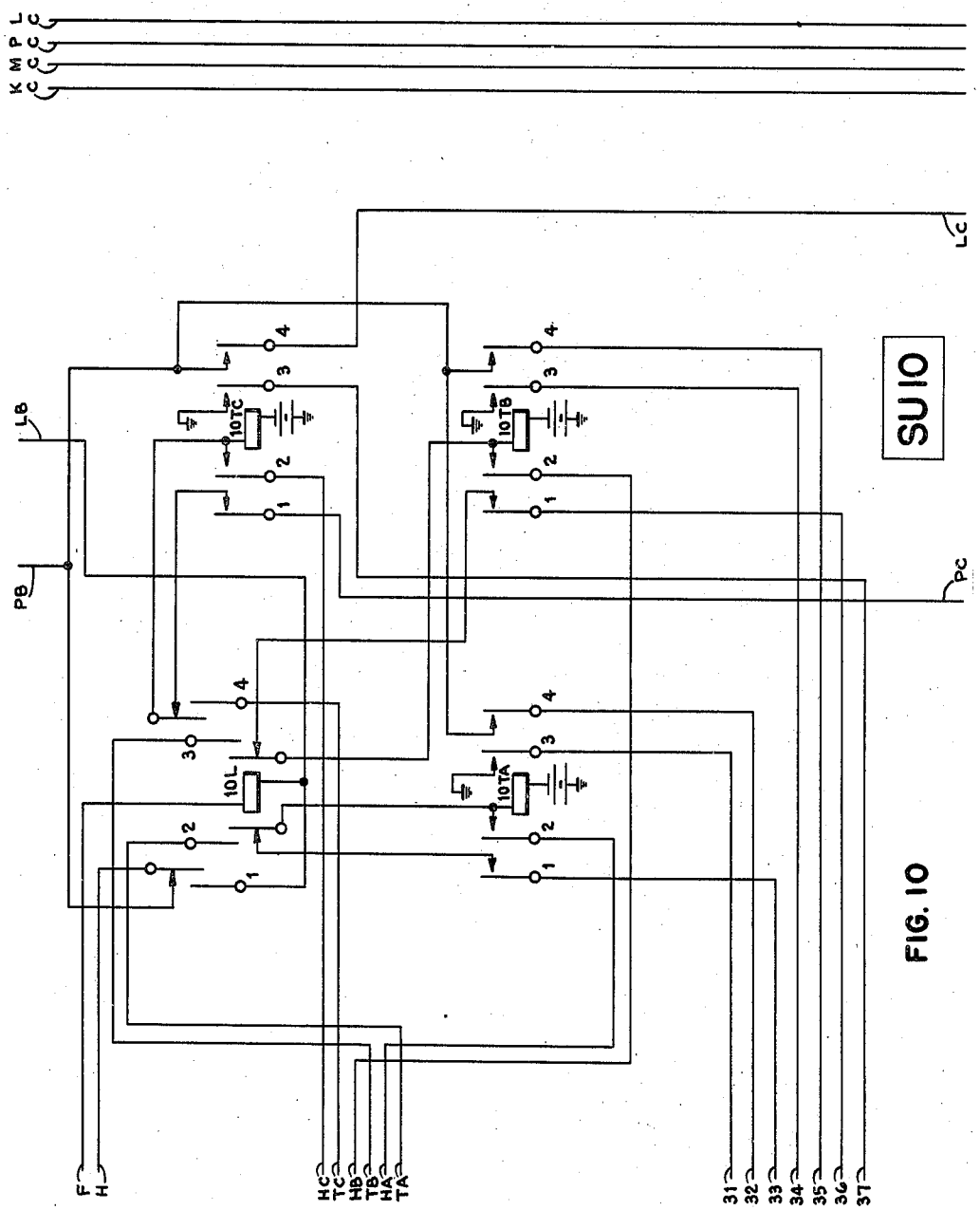

Two of the connections from Figs. 9 and 10 to the next lower rank of the pyramid go to the units RU11 and SU11 of Fig. 24 diagrammatically indicated by rectangles in Fig. 11 which have also connections indicated by characteristic combinations of signals, which connections go to display units not shown in Fig. 11. The third of these connections KC, MC, PC, LC goes to the routing and selection units shown in detail in Figs. 11 and 12 which correspond to units RU13 and SU13 of Fig. 24. One of the connections from Figs. 11 and 12 is shown going to the key 14AK and the display unit shown in detail in that figure whilst the other two connections go to sets of terminals BCB and BCC in Fig. 14. These terminals are connected to other keys and display units not shown.

It will be seen from the foregoing description that when a key such as 14AK is actuated a first signal is sent out from the control station and provided that signal received back from the substation indicates that the selection has been correctly performed, the following signal is sent out. The whole process of sending signals back and forth between the control station and the substation takes only a few seconds and during that period the key must be kept actuated. If any error has arisen during the sending to and fro of signals as evidence by a signal coming back from the substation showing a selection not agreeing with the signal previously sent from the control station the process of sending comes to an end, and also the process of selection and the absence of the lighting of the lamp (presently to be described) within a few seconds will show the operator that something has gone wrong and he must try again. If some error has occurred it is thus not possible for a signal indicating a desired actuation of a particular piece of apparatus to cause the actuation of the wrong piece of apparatus.

It will be seen also that although the wire F at the control station and the corresponding wire F at the substation are connected to all the selection units in the corresponding station each time a signal is received thereat, it is not possible for any selection unit except the one previously selected to respond to the signal as only one relay is prepared for operation by the potential on such wire F.

Returning now to the operations consequent upon the operation of key 14AK, the selection of corresponding display units at the control station and at the desired substation has been described. The relay 14L has been prepared for operation by the receipt at the control station of a signal sent back from the substation in response to the final selection signal sent from the control station. If this signal received at the control station is the same as that sent out there is a circuit for sending out the signal to denote the operation required of the selected apparatus. Suppose the key 14AK has been actuated to the "on" position, positive potential is connected from 12ta3 front, wire 41, 11ca3 front, wire 49, lead b, "on" contacts of the key 14AK wire RB, to relay 2B and negative. It will be seen that this circuit is completed because the relay 11CA has been operated to determine that the last selection signal to be sent out is of kind A and relay 12TA operated on the receipt back of a signal also of kind A.

At the substation, the operation of relay 20TA has prepared relay 23L for operation by extending positive potential on the H wire over 20l1 back, 20ta4 front, wire LA to one side of relay 23L. When the signal is received and negative potential is applied to the F wire relay 23L operates, releasing relay 20TA and at its contacts 23l2 closing a circuit for 23T via wire TB to 15mb2 front, 15qa1 back to positive. Relay 23T operates in this circuit and at its contacts 23t4 closes an obvious circuit for relay 23AR in the associated control unit shown below the dashed line in Fig. 23. Relay 23AR operates the control magnet 23CM to close the circuit breaker, or to light a lamp, not shown. In either case, operation of the actual circuit closing member into the closed position results in well manner in the closure of auxiliary contacts 23AC which complete a circuit for relay 23SR. Positive potential is thereupon connected over contacts 23l1 front, 23sr1 front to wire RB, to operate relay 15B, which sends back a signal of the kind B to the control station, indicating that the desired operation has taken place. When negative potential is removed from wire F, relay 23L releases, but relay 23T remains operated over 23k2 back, 23l2 back, 23t1 front to positive.

When the signal of kind B is received at the control station, the application of negative potential to the F wire causes the operation of relay 14L and relay 14T is connected via 14k2 back, 14l2 front over the wire TB, 2mb2 front, 2qa1 back to positive and operates. At front contacts 14t3 it closes a circuit to light a lamp 14LP which indicates to the operator that the circuit breaker at the substation has closed. When relay 14L releases upon negative potential being removed from wire F, relay 14T remains operated over 14k2 back, 14l2 back, 14t1 front. Thus relays 23T and 14T remain operated to keep the circuit breaker closed at the substation and the lamp 14LP lit at the control station.

If desired an additional lamp may be provided at the control station, this lamp being lit over the back contacts of relay 14T to denote the unoperated position of the apparatus.

Suppose, now, the key 14AK to be operated to the "off" position, positive potential is connected over 12ta3 front, wire 41, 11ca3 front, wire 49, lead b, contacts of the key in "off" position to the wire RA to operate relay 2A which sends to the substation a signal of kind A. When relay 23L operates, the holding circuit for relay 23T is broken and as no potential is applied to wire TB, relay 23T releases, followed by relay 23AR in the control unit, the release of the control magnet 23CM, the opening of the auxiliary contacts 23AC and the release of relay 23SR. Positive potential is connected over 23l1 front, 23sr1 back to wire RA to operate relay 15A, which sends back a signal of kind A to the control station. At the control station the relay 14L breaks the holding circuit for relay 14T and this relay is deprived of an operating circuit and releases, opening the circuit of lamp 14LP.

It will be observed that, during the period of control, signals are continuously passing to and fro over the line so that relay 15Z is kept operated, either over one or both of the contacts 15p1 and 15q1 or over front contacts 15r3. Relay 15Z is slow to release so remains operated during the brief intervals between opening of contacts of 15P and/or 15Q and closure of contacts of 15R and vice versa. When signals cease, however, the circuit of 15Z is opened for a time sufficient to allow that relay to release, followed by 15ZA. The circuit of relay 15X is reclosed at 15za1 back and that relay reoperates. The function of relay 15X is to prepare the circuit of relay 16L for operation when the first signal of a series is received from the control station; thereafter it releases and remains released during signalling in order that relay 16L shall not be re-operated during the receipt of any signal after the first.

At the control station relay 2Z remains operated whilst positive potential is applied to the H wire, i. e. whilst the key remains actuated. When the key is released, all the previously operated relays in the routing units release, removing positive potential from the H wire and opening the circuit of relay 2Z, which releases after an interval, followed by 2ZA and relay 2X reoperates. The function of relay 2X is to prepare relay 1L for operation during receipt of the first signal back from the substation. The relay 1L is prevented from operation during the sending out of the first signal from the control station, because the circuit between wire H and one side of this relay over contacts 2r3, back 2za2 front and 2x3 front is open during the period that negative is applied to the F wire. During the receipt of the first signal, however, back contacts 2r3 and front contacts 2za2 are closed, thus allowing relay 1L to operate. Thereafter relay 2X is released and so relay 1L cannot reoperate subsequently during signalling.

Should the operator at the control station desire to check the position of all the apparatus at a substation, the movable contacts of the substation selecting switch SSS, Fig. 7 are set on the fixed contacts representing the particular substation and the key SSK is actuated. Assume that the switch SSS is set in the position shown and key SSK operated. Relay 7CA is operated from contacts of the key and positive potential applied over 7ca1 front, 7cb1 back, 7cc1 back, contacts of switch SSS wire KA to operate relay 5CA. Relay 3CB is operated over 5ca1 front, 5cb1 back, 5cc1 back, wire KB to winding 3CB and positive potential applied to the H wire in the same manner as previously described. A preliminary signal of kind C and selecting signals of kinds B and A are sent out as previously described and result in the selection at the substation of the selection unit SU1 shown in Fig. 18 and the sending back of signals of the same kind to the control station. These signals when received back at the control station cause the operation of the relay 6TA. Positive potential is now connected over 6ta3 front, wire SA 5ca3 front wire MA, contacts of switch SSS, 7cc2 back, 7cb2 back, 7ca2 front, wire RA, relay 2A and negative. Relay 2A operates and causes a signal of kind A to be sent to the substation.

At the substation, relay 18L operates when negative is applied to the wire F, and relay 18TA operates to positive applied to the wire TA. A signal of kind A is sent back to the control station. Relay 18L releases and positive potential on the wire H is extended over 18l1 back 18ta4 front, wire LA winding of relay 21K, 22k1 back to negative.

At the control station the operation of relay 6TA prepares relay 8L for operation and on the signal of kind A sent back from the substation, relay 8L operates followed by relay 8TA in response to the signal of kind A. When relay 8L releases, positive potential from the H wire is extended over 8l1 back, 8ta2 front wire LA to one side of relay 13K in the first display unit at the control station. The display units at the control station and at the substation are similar and similarly arranged. At the substation, however, a control unit is associated with each display unit.

Fig. 21 shows the circuits of the first display and control units at the substation and Fig. 22 the circuits of the next display and control units, the dotted lines indicating the division of the units corresponding to Fig. 25. In addition to the wires connecting each first display unit to the common multiple, there are three wires marked P, K and LK connecting each display unit to the next in the series. The wire LK connecting each display unit to the next in the series is connected in the latter to a back contact of make before break contacts (22k1) of a relay corresponding to relay 22K therein. In the even display units, such as that shown in Fig. 22 negative potential is connected to these contacts. In each odd display unit after the first the wire H is connected to these contacts as shown in Fig. 23. In the control station the display units are similarly arranged the connection of negative potential to these contacts in the even display units is indicated in dotted lines to k1 in Fig. 14.

Owing to the connection of negative potential to these contacts in the second display unit at the control station relay 13K in the first display unit operates in response to the signal of kind A received back from the substation and locks over 13k1 front to positive on the H wire. At contacts 13k4 positive potential on wire H is extended to one side of relay 13L to prepare it for operation when a subsequent signal is received from the substation. If relay 13T was in operated condition its previous holding circuit is broken at contacts 13k2 but a new holding circuit is completed over 13k2 front, 13t1 back to 13t1 front. Relay 8TA holds over 8l2 back 8ta1 front wire PA, 13l2 back to wire H and positive potential.

At the substation relay 21K operates and locks in a similar manner to 13K and prepares 21L for operation on a subsequent signal being received:

Relay 21T is maintained in whatever condition it was previously.

At the control station the operation of relay 8TA causes the connection of positive potential over 8ta3 front, wire 20 7ca3 front, contacts of key SSK to wire RB and relay 2B to send a signal of kind B to the substation. As will be seen, the signal sent at this time can be of any kind, its effect is to cause the substation to send back a signal, not necessarily of the same kind as that received, but a signal of a kind representing the condition of the apparatus associated with the first display unit at the substation.

When the signal sent from the control station is received at the substation, application of negative potential to wire F results in the operation of relay 21L, which at contacts 21l1 locks itself to positive potential on the H wire and breaks the circuit of relay 18TA, which releases. A circuit is completed from negative, 22k1, back 21k3 front, 21l3 front, winding of 22K, wire 52, 23k1 back wire H and positive. Relay 22K operates and locks over 22k1 front, whilst the circuit of relay 21K is broken at the last mentioned contacts and that relay releases. At contacts 21l4 front positive potential is connected over contacts 21sr1 via wires 54 or 55 to either wire RA or RB according to the position of the last mentioned contacts to send a signal back to the control station of a kind indicating the condition of the auxiliary contacts 21AC. Relay 21L releases when negative potential is removed from wire F and positive potential on the wire H is extended over 21l1 back, 22k4 front to one side of relay 22L to prepare it for operation on the following signal.

At the control station, when the signal is received back, and negative potential is applied to the wire F, relay 13L operates and acts in a similar manner to relay 21L at the substation. At the control station, however, the circuit of relay 13T differs from that of 21T and on the closure of contacts 13l2 relay 13T is connected, whether 13K is or is not operated, to the wire TB. If the signal received back is of kind B, indicating that contacts 21AC are closed, relay 13T operates and locks over 13t1 front. If the signal received back is not of kind B, indicating that contacts 21AC are open, there is no circuit for relay 13T and it releases.

Positive potential is connected over contacts 13l4 front, and since there is no control unit at the control station, this positive potential is connected to wire RB and operates relay 2B to send out another signal of kind B. This signal acts upon the second display unit and causes a signal to be sent back to the control station indicating the position of the second piece of apparatus at that station. The process continues in the same manner until the condition of each piece of apparatus at the substation has been indicated at the control station.

It will be seen that in the system described a control is effected by a train of pulses from the control station to all sub-stations.

Each pulse is one of three kinds.

Kind A—pulse on channel 101
Kind B—pulse on channel 102
Kind C—pulse on channels 101 and 102.

The first pulse is always kind C. This pulse is used to prove continuity, the sub-stations being arranged so that unless a pulse of kind C is received satisfactorily, no further pulses are effective.

Further pulses are used to select:

a. The particular sub-station
b. The particular facility at that sub-station.

Each pulse being one of three kinds, three way discrimination is made by each pulse, the series of such pulses being used to give wider discrimination, e. g.

1 pulse gives three possible discriminations
2 pulse gives nine possible discriminations
3 pulse gives twenty-seven possible discriminations The particular service having been selected in this manner, the final pulse effects the desired control of the selected service.

The process of selection is effected pulse by pulse, at each pulse three choices being available, the pulse by its kind selecting one of them. These three choices are presented within each selection unit, the units being arranged in ranks; as described, the individual ranks corresponding, in order, to the individual pulses of the received train. Thus if the pulses following the proving pulse be numbered in order, the first pulse can make one of three discriminations only and there is therefore only one selection unit in the first rank. For each of these discriminations three further discriminations can be made by a second pulse. In the second rank therefore there are three selection units for a total of nine two-pulse discriminations. For each of these nine discriminations three further discriminations can be made by the third pulse. In the third rank therefore there would be nine selection units for a total of twenty-seven three-pulse discriminations, and so on.

The selection units in this manner form a pyramid starting with one selection unit at the apex in the first rank, to each unit in any rank there being three subsidiary units in the next rank.

The effect of any control signal is proved by a train of pulses from the sub-station to the control station. These pulses interleave with those of the controlling signal, the first pulse of the train immediately following the first pulse of the controlling signal from the control station. The kind of each pulse in the check signal relates to the pulse in the controlling signal which immediately preceded it, being determined by the response of the sub-station to that pulse.

Thus the first pulse, if the sub-station responds, will be of kind C.

Further pulses will be of kinds A, B or C according as the actual discrimination made by the immediately preceding pulse of the controlling train corresponds to kind A, B or C of that signal. Thus if the pulse of the controlling train is of kind B say, but owing to a fault the actual discrimination made corresponds to a pulse of kind A or C, the proving pulse will be A or C.

The kind of the final pulse is determined, not by the kind of the final pulse of the controlling train, which immediately precedes it, but by the effect of that pulse.

In order to prevent maloperation, the sending of each pulse, other than the first, of the controlling train is dependent upon the previously received pulse of the check train. Unless the kind of this pulse, determined as mentioned above by actual discrimination made by the previous pulse of the controlling train, tallies with the kind of pulse as it should have been transmitted, the next pulse of the controlling train will not be transmitted.

Slow relays at both the control and sub-stations operate at the beginning of signalling and remain operated until pulsing ceases.

Should the interlock mentioned above prematurely interrupt the pulsing, the selection so far established breaks down and the control must be reinitiated.

What is claimed is:

1. An electric selective signalling system comprising a control station and a substation, means at the control station for preparing a series of code signals which vary in kind, means for converting said signals and for sending corresponding signals to said substation, a plurality of selection units at said substation for receiving each signal, of said series of code signals, means in said selection units responsive to said signals for performing a selection in response thereto according to the kind of said signal means associated with each of said selection units for sending back to the control station a signal corresponding in kind to the transmitted signal and means at the control station for sending a further signal only upon the receipt of a signal following the selection effected by the signal sent immediately preceding such receipt.

2. In an electric selective signalling system arranged to be operated by signals of different kinds comprising, a plurality of selection units connected together in a number of ranks, the number of units in successive ranks progressively increasing and constituting a pyramid formation, a plurality of wires one for each kind of signal together with a positive and a negative wire extending from said translating unit to each of said selection units, a preparing relay in each selection unit having one side thereof connected directly to said negative wire, a routing relay in each selection unit for each kind of signal connected over contacts of said preparing relay when said preparing relay is operated to one of said plurality of wires respective of its own kind of signal, means operative upon the receipt of a signal to apply to and afterwards remove from said negative wire a potential of one sign and to apply potential to one of said plurality of wires particular to the kind of signal received, means operative upon the commencement of signalling to apply to said positive wire and keep applied thereto during signalling a positive potential and means in each selection unit to connect said positive wire over operated contacts of a routing relay therein to the side of the winding of a preparing relay in a further selection unit which is opposite to the side of the winding to which said negative wire is connected.

3. In an electric selective signalling system comprising a plurality of similar selection units connected together in a number of ranks, each unit being connected to a plurality of units in the next rank whereby the number of units in successive ranks progressively increases thus constituting a pyramid formation, means for successively selecting certain of said selection units within the ranks in response to successive code signals, means in said selection units responsive to said code signals and operative to select one of said plurality of units in the next rank, means at a control station for transmitting corresponding signals to all said selection units simultaneously to cause operation of the preselected unit to select one of a plurality of units in the succeeding rank for operation by a succeeding code signal whereby each code signal selects one of a plurality of units in the successive ranks, and means associated with said selection units and operative on the receipt of each signal thereat to send back to said control station a corresponding signal.

4. In an electric selective signalling system comprising a receiver, means at a control station for supplying signals of different kinds to said receiver, means in said receiver for converting said signals into corresponding marking potentials on a plurality of wires corresponding to the several kinds of signals, a plurality of similar selection units multiplied to said wires, means for selectively conditioning said selection units one at a time in response to successive signals for response to said marking potentials as determined by the selection indicated by a previous signal, and means associated with said selection units and operative on the receipt of each signal thereat to send back to said control station a corresponding signal.

5. An electric selective signalling system comprising a plurality of selection units at a substation adapted to respond progressively to each of a series of signals transmitted thereto from a control station to extend a control circuit towards a particular piece of apparatus to be controlled at the sub-station, means associated with said selection units and operative on the receipt of each signal thereat to send back to the control station a corresponding signal, apparatus at the said control station to send out a selected series of signals automatically and means associated with said apparatus and responsive to said corresponding signals received from successive selection units to control the sending of each signal of the series.

6. In an electric selective signalling system comprising a plurality of similar selection units connected to a signalling channel, said selection units being connected together in a plurality of ranks whereby a plurality of outlet circuits from a unit in one rank lead to inlet circuits individual to a plurality of units in another rank, means at a control station for transmitting selecting signal codes to said units, means in said units responsive to said selecting signal codes to prepare a selected outlet circuit to a succeeding unit in the next rank, means for feeding signal codes simultaneously to all of said selecting units whereby the circuit prepared by one signal of the code is responsive to extend the circuit to a selection unit in the next rank, a plurality of control devices selectively associated with said selection units, and means associated with said selection units and operative on the receipt of each signal thereat to send back to said control station a corresponding signal.

7. In an electric sensitive signalling system according to claim 6 wherein each selection unit comprises a conditioning relay associated with the inlet circuit and with a multiple common to all the selection units, a plurality of code responsive relays each individual to the plurality of outlet circuits, contacts operated by the conditioning relay arranged to connect the code responsive relays to corresponding code marking wires common to all the selection units and contacts operated by the code responsive relays to extend a circuit from one of the outlet circuits to the inlet circuit of a similar selection unit in the next succeeding rank.

ERIC MALCOLM SWIFT McWHIRTER.
HUGH JENNINGS WARD.

(References on following page)

REFERENCES CITED

The following references are of record in the file of this patent:

UNITED STATES PATENTS

| Number | Name | Date |
|---|---|---|
| 897,662 | Roberts | Sept. 1, 1908 |
| 1,695,840 | Chauveau | Dec. 18, 1928 |
| 1,929,402 | Belliveau | Oct. 10, 1933 |
| 1,938,213 | Black | Dec. 5, 1933 |
| 2,074,423 | Peterman | Mar. 23, 1937 |
| 2,091,301 | Boswau | Aug. 31, 1937 |
| 2,103,761 | Wheeler | Dec. 28, 1937 |
| 2,117,580 | Snavely | May 17, 1938 |
| 2,129,168 | Dicke | Sept. 6, 1938 |
| 2,276,646 | Boswau | Mar. 17, 1942 |
| 2,336,064 | Burns | Dec. 7, 1943 |